United States Patent
Cosentino et al.

(10) Patent No.: US 12,325,647 B2
(45) Date of Patent: Jun. 10, 2025

(54) ELECTROLYTIC BIOCIDE-GENERATING UNIT WITH FLOW TRANSITION DETECTION

(71) Applicant: ElectroSea, LLC, Plymouth, MN (US)

(72) Inventors: Louis Ciro Cosentino, Palm Beach Gardens, FL (US); Daniel L. Cosentino, Wayzata, MN (US); Brian Alan Golden, Eden Prairie, MN (US)

(73) Assignee: ElectroSea, LLC, Plymouth, MN (US)

( * ) Notice: Subject to any disclaimer, the term of this patent is extended or adjusted under 35 U.S.C. 154(b) by 899 days.

(21) Appl. No.: 17/446,127

(22) Filed: Aug. 26, 2021

(65) Prior Publication Data

US 2022/0064032 A1 Mar. 3, 2022

Related U.S. Application Data

(60) Provisional application No. 63/195,900, filed on Jun. 2, 2021, provisional application No. 63/135,155, filed on Jan. 8, 2021, provisional application No. 63/071,691, filed on Aug. 28, 2020.

(51) Int. Cl.
   *C02F 1/50* (2023.01)
   *C02F 1/00* (2023.01)

(52) U.S. Cl.
   CPC ............... *C02F 1/50* (2013.01); *C02F 1/008* (2013.01)

(58) Field of Classification Search
   None
   See application file for complete search history.

(56) References Cited

U.S. PATENT DOCUMENTS

| | | | |
|---|---|---|---|
| 2007/0158176 A1* | 7/2007 | Briggs | C02F 1/461 204/280 |
| 2008/0250868 A1 | 10/2008 | Konzelmann et al. | |
| 2010/0154819 A1* | 6/2010 | Doglioni Majer | F24H 9/0042 134/1 |
| 2017/0314282 A1* | 11/2017 | Nix | C02F 1/008 |

(Continued)

FOREIGN PATENT DOCUMENTS

| | | |
|---|---|---|
| JP | 8-89967 A | 4/1996 |
| WO | 2019/070877 A1 | 4/2019 |

(Continued)

OTHER PUBLICATIONS

International Search Report and Written Opinion for Application No. PCT/US2021/048026 mailed Feb. 3, 2022.

*Primary Examiner* — Richard C Gurtowski
(74) *Attorney, Agent, or Firm* — Merchant & Gould P.C.

(57) ABSTRACT

The present disclosure relates to a biocide-generating device for outputting a biocide to a water system. The biocide generating device includes a housing having a water inlet for receiving water from the water system and a water outlet for outputting water containing biocide to the water system. The biocide-generating device also includes an electrode arrangement having first and second electrodes positioned in the housing for generating biocide in the water within the housing, and an electrical power circuit for establishing a flow of electrical current between first and second electrodes of the electrode arrangement for generating the biocide in the water within the first chamber electrolytic cell. A flow sensor such as an ultrasonic flow sensor is provided for sensing water flow through the housing.

15 Claims, 14 Drawing Sheets

(56) References Cited

U.S. PATENT DOCUMENTS

| | | |
|---|---|---|
| 2019/0106339 A1 | 4/2019 | Cosentino et al. |
| 2020/0255306 A1 | 8/2020 | Cosentino et al. |
| 2021/0087081 A1* | 3/2021 | Griffis .................... C25B 15/02 |

FOREIGN PATENT DOCUMENTS

| | | |
|---|---|---|
| WO | 2019/165161 A1 | 8/2019 |
| WO | 2020/167645 A1 | 8/2020 |
| WO | 2020/210245 A1 | 10/2020 |
| WO | 2021/061612 A1 | 4/2021 |

* cited by examiner

ELECTROLYTIC BIOCIDE-GENERATING UNIT WITH FLOW TRANSITION DETECTION

CROSS REFERENCE TO RELATED APPLICATIONS

The present application claims the benefit of U.S. Provisional Patent Application No. 63/071,691, filed Aug. 28, 2020, U.S. Provisional Patent Application No. 63/135,155, filed Jan. 8, 2021, and U.S. Provisional Patent Application No. 63/195,900, filed Jun. 2, 2021, the disclosures of which are hereby incorporated by reference herein in their entirety.

TECHNICAL FIELD

The present disclosure relates generally to biocide-generating devices for reducing or eliminating biofouling within water systems. The disclosure also relates to flow sensors and control strategies for flow sensors.

BACKGROUND

Bio-fouling caused by bio-growth (e.g., salt water or fresh water marine growth) can result in the clogging of water systems, and the inefficient operation, overheating, and malfunction of equipment dependent upon the water systems thereby leading to costly downtime and expensive repair. For some applications, the issue of bio-growth within water systems is addressed by periodic (e.g., semi-annual) acid cleaning of the water systems. Acid cleaning is expensive, time consuming, and involves the use of harsh and hazardous chemicals. Improvements in this area are needed.

SUMMARY

One aspect of the present disclosure relates to a biocide-generating system for inhibiting biofouling within a water system. In one non-limiting example, the system can be a water system of a watercraft such that related equipment (e.g., a heat exchanger) of the watercraft can be operated at peak performance with minimal to no downtime. In certain examples, the biocide-generating system can include an electrolytic arrangement for providing the in situ generation of biocide within the water passing through the water system. Biocide-generating systems in accordance with the principles of the present disclosure can be used for both salt water (e.g., sea and brackish water) as well as freshwater applications.

Aspects of the present disclosure relate to a control system for an electrolytic biocide generating unit, the control system preventing the over production of biocide during and after flow transitions.

Aspects of the present disclosure relate to a control system for an electrolytic biocide generating unit, the control system detecting water flow transitions through the unit and modifying or stopping biocide generation in response to the detection of the flow transitions.

Aspects of the present disclosure relate to a control system for an electrolytic biocide generating unit, the control system detecting water flow sampling water flow rates through the unit during operation of the unit continuously, or at least every half second, or at least every second, or at least every 2 seconds, or at least every 3 seconds or at least every 4 seconds so that flow transitions can be quickly detected and biocide generation can be modified accordingly.

Aspects of the present disclosure relate to a control system for an electrolytic biocide generating unit, the control system being capable of detecting and distinguishing a direction of flow through the unit (e.g., detecting when water is flowing forwardly through the unit and detecting when water is flowing in a reverse direction through the unit with the control system being able to distinguish between forward flow and reverse flow). In certain examples, the controller stops biocide generation or prevents biocide generation from being initiated when reverse flow is detected.

Aspects of the present disclosure relate to a control system for an electrolytic biocide generating unit, the control system being configured to sense water flow through the unit and to stop biocide production when a pre-determined decrease in flow (e.g., rate of flow) occurs over a pre-determined time period. In one example, the control system stops biocide production when a decrease in water flow of at least 10, 15, 20, 25 or 30 percent occurs over a time period of no more than 10 seconds, 5 seconds, 4 seconds, 3 seconds, 2 seconds or 1 second.

Aspects of the present disclosure relate to biocide-generating device for inhibiting bio-fouling within a water system, the biocide-generating device including: a housing including a water inlet for receiving water from a water storage container and a water outlet for outputting water containing biocide to the water storage container; an electrode arrangement including first and second electrodes positioned in the housing for generating biocide in the water within the housing; an electrical power circuit for establishing a flow of electrical current between first and second electrodes of the electrode arrangement for generating the biocide in the water within the first chamber electrolytic cell; and a controller, the controller being configured to regulate a quantity of the biocide provided to the water storage container based on a sensed flow of water from the water storage container to the water system.

Another aspect of the present disclosure relates to an ultrasonic sensor unit suitable for sensing flows through systems in accordance with the principles of the present disclosure. In certain examples, the ultrasonic sensing unit is adapted for use in corrosive environments such as for sensing flow of saltwater. The ultrasonic sensing unit includes a molded body including a first fitting, a second fitting and a flow passage that extends through the molded body between the first and second fittings. The molded body also includes a control chamber separated from the flow passage. The control chamber includes a main region and first and second pockets. The first and second pockets are defined respectively by first and second portions of the molded body that project into the flow passage. The first and second pockets are fluidly isolated from the flow passage by the molded body. The first and second pockets are located on opposite sides of the flow passage with the first and second pockets being located upstream/downstream from one another with respect to a flow direction of flow through the flow passage. The ultrasonic sensor unit also includes an electronic controller position within the main region of the control chamber. The ultrasonic sensor unit further includes first and second ultrasonic sensors respectively positioned in the first and second pockets. The first and second sensors are adapted to generate and receive sonic signals transferred through the flow passage. The controller is adapted to interface with the first and second ultrasonic sensors to control generation of the sonic signals and to monitor receipt of the sonic signals for use in determining flow velocity through the flow passage by differential time methodology.

Based on the sensed flow velocity, the controller can calculate rates of flow based on the cross-sectional area of the flow passage.

Aspects of the present disclosure also relate to electrode-based biocide generating systems including ultrasonic flow sensors for use in determining flow rates through the biocide generating devices.

Aspects of the present disclosure also relate to methods of calculating signal travel time differentials and flow based on data from ultrasonic sensors which generate and received ultrasonic signal transmitted through a fluid.

A variety of additional aspects will be set forth in the description that follows. The aspects can relate to individual features and to combinations of features. It is to be understood that both the forgoing general description and the following detailed description are exemplary and explanatory only and are not restrictive of the broad inventive concepts upon which the examples described herein are based.

BRIEF DESCRIPTION OF THE DRAWINGS

The accompanying drawings, which are incorporated in and constitute a part of the specification, illustrate aspects of the present disclosure and together with the description, serve to explain the principles of the disclosure. A brief description of the drawings is as follows.

DETAILED DESCRIPTION

The present disclosure relates to a biocide-generating devices and systems for inhibiting bio-fouling within a water system. Example biocides can include chlorine and derivatives thereof, copper, and other biocides. Certain aspects of the present disclosure relate to features that enhance the controlled production of biocide with a water system. Certain aspects relate to control systems that effectively prevent the over production of biocide during flow transition occurrences such as flow stoppages.

Figure 1:
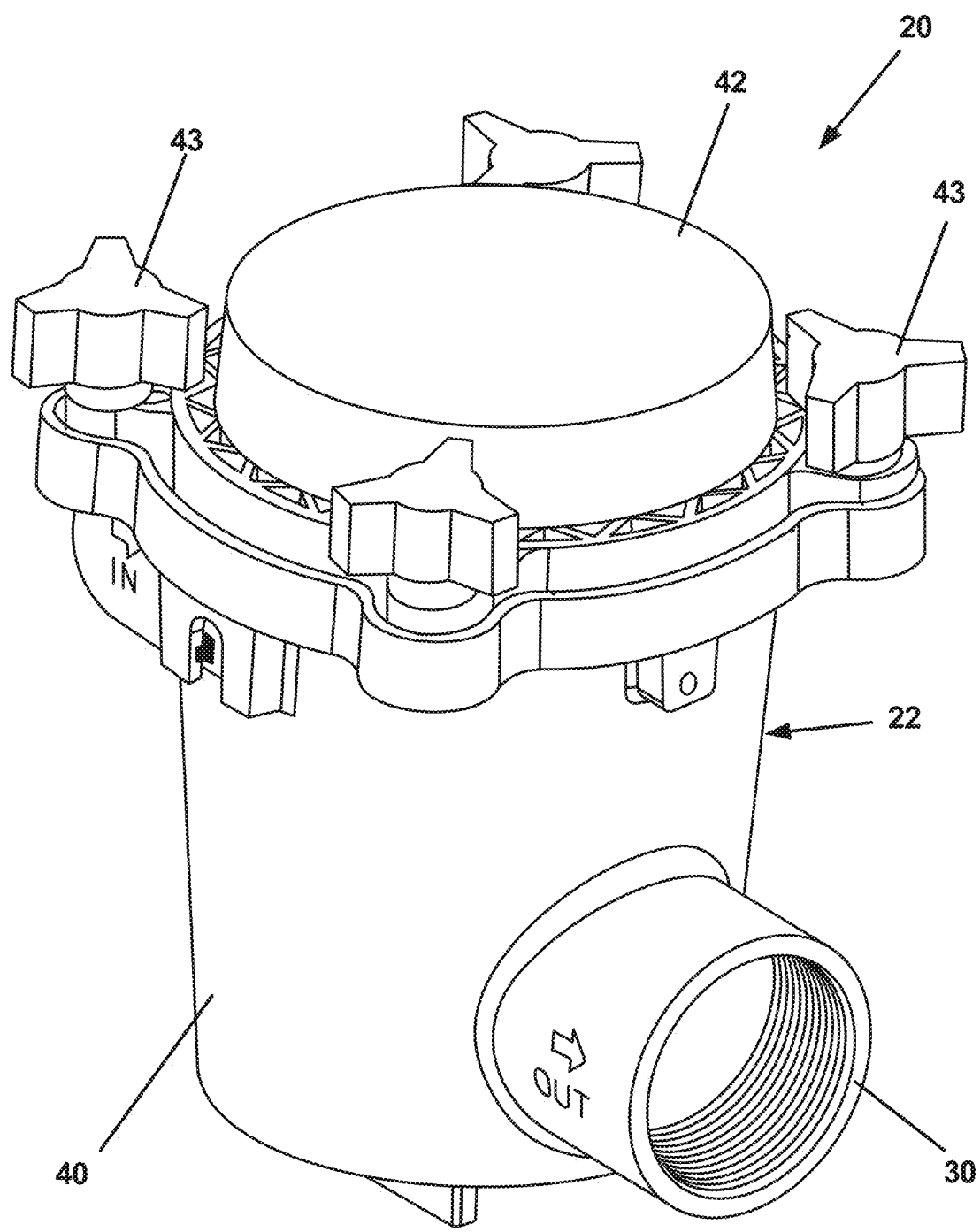
FIG. 1 illustrates a biocide-generating device (e.g., a biocide-generating unit) in accordance with the principles of the present disclosure.
Figure 2:
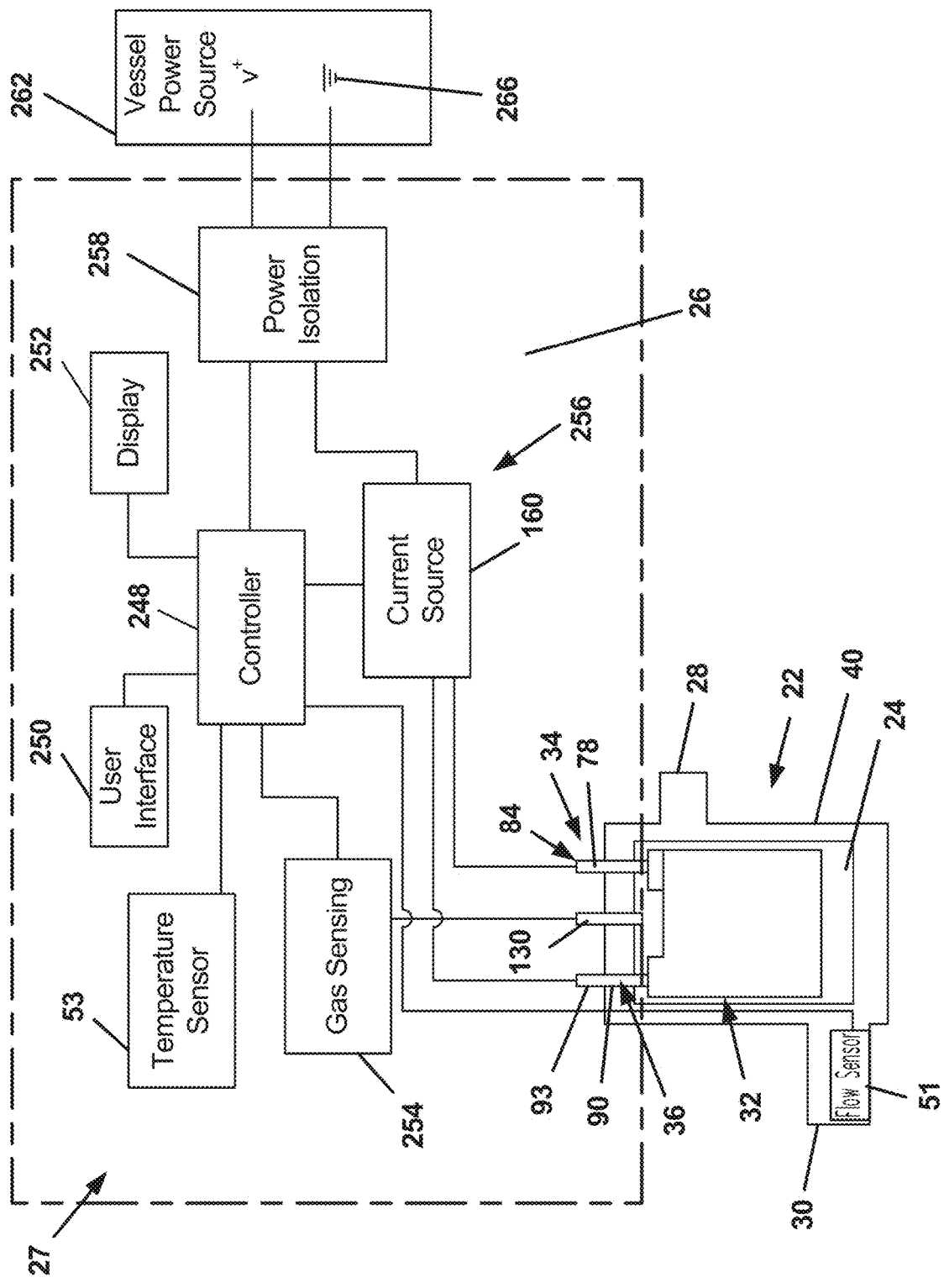
FIG. 2 is a schematic view of the biocide-generating device of FIG. 1.

FIGS. 1-2 depict an example biocide-generating unit 20 (e.g., a biocide-generating device) in accordance with the principles of the present disclosure. The biocide-generating unit 20 includes a unit housing 22 defining a first chamber 24 and a second chamber 26 (see FIGS. 2 and 4). The first chamber 24 provides a location within the unit housing 22 in which biocide can be generated, and the second chamber 26 provides a housing location for circuitry 27 that controls operation of the biocide-generating unit. The unit housing 22 includes a water inlet 28 for receiving water into the first chamber 24 and a water outlet 30 for outputting water containing biocide generated within the first chamber 24 to a water system desired to be treated with biocide (e.g., a water system of a watercraft). The biocide-generating unit 20 also includes an electrode arrangement 32 including first and second electrodes 34, 36 positioned in the first chamber 24 for generating biocide in the water flowing through the first chamber 24 between the water inlet 28 and the water outlet 30 when a voltage is applied across the first and second electrodes 34, 36. Power leads 38 extend outwardly from the unit housing 22. The power leads 38 are adapted for coupling the circuitry 27 within the second chamber 26 to an external power source 262 having its own ground 266. The power source 262 can be a battery, generator, or other power source. In certain examples, the power source can range from 12-240 volts and can provide alternating current (AC) or direct current (DC). Preferred power sources include 12 volt DC, or 24 volt DC, or 110 volt AC or 240 volt AC power sources. At FIGS. 4 and 6, the circuitry 27 is shown integrated as part of a multi-layer circuit board 29. In certain examples, one or more flow sensors 51 can be used to sense the rate of flow of water through the electrolytic cell, and one or more temperature sensors 53 can be used to sense the temperature of the circuitry 27, the chamber 26, and/or portions of the unit housing 22. Power to the cell can be reduced or terminated by a cell controller when low or no flow conditions are detected and/or when temperatures exceed predetermined levels.

Figure 3:
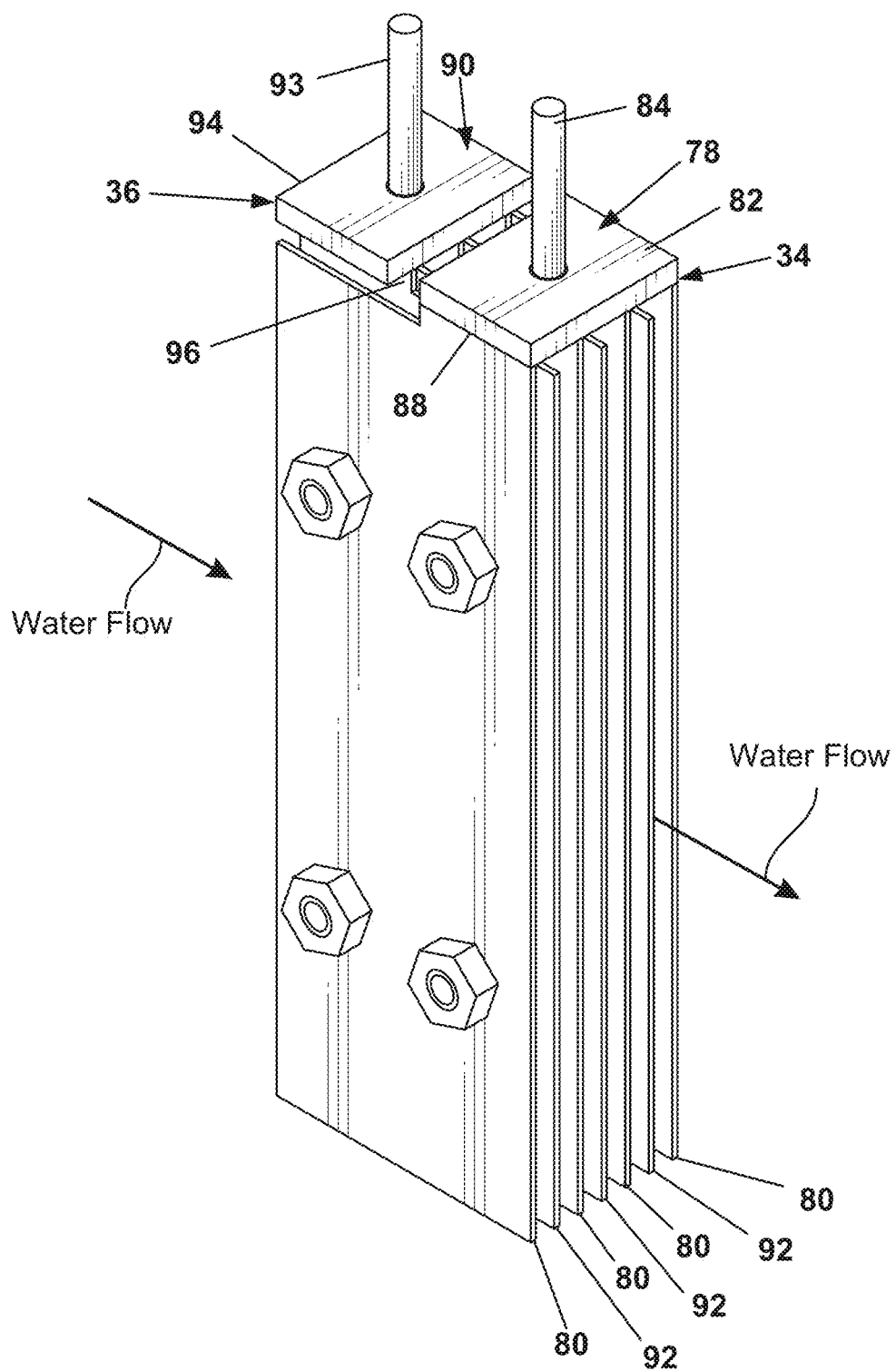
FIG. 3 is a perspective view illustrating an example configuration for an electrode arrangement of the biocide-generating device of FIGS. 1 and 2.

Referring to FIG. 3, the first electrode 34 can include a first terminal 78 electrically coupled to a plurality of parallel first electrode plates 80. The first terminal 78 includes a first terminal block 82 and a first terminal post 84. The first electrode plates 80 are electrically and mechanically coupled to the first terminal block 82. In one example, the first electrode plates 80 include main bodies 86 and upper tabs 88. The upper tabs 88 are preferably electrically and mechanically coupled to the first terminal block 82 by means such as welding or soldering.

Referring still to FIG. 3, the second electrode 36 can have a similar configuration as the first electrode 34. For example, the second electrode 36 includes a second terminal 90 and parallel second electrode plates 92 that are electrically and mechanically coupled to the second terminal 90. The second electrode plates 92 are positioned between the first electrode plates 80 and spaced-apart in relation relative to the first electrode plates 80 such that interstitial space exists between each of the first electrode plates 80 and a corresponding one of the second electrode plates 92. The second terminal 90 includes a second terminal block 94 electrically and mechanically coupled to upper tabs 96 of the second electrode plates 92. The second electrode plates 92 also include main bodies 98 and the second terminal 90 includes a second terminal post 93.

In certain examples, the terminal posts, the terminal blocks and the terminal plates can have metal constructions that include a metal material such as titanium or stainless steel. In certain examples, the first and second electrode plates 80, 92 can be coated with a catalyst material for catalyzing the production of chlorine or derivatives thereof. In one example, the catalyst coating can include a platinum group metal. Example platinum group metals suitable for use in a catalyst coating include iridium and ruthenium. In certain examples, the catalyst coating may include metal oxide mixtures that can include oxides of iridium, and/or oxides of ruthenium and/or oxides of titanium and/or oxides of tantalum and/or oxides of niobium. It will be appreciated that the above catalysts are merely examples and that other catalyst mixtures can also be used. In other examples, at least one of the sets of electrode plates 80, 92 is constructed of a material that includes copper such that copper ions are generated when voltage is applied across the plates 80, 92.

The circuitry 27 within the second chamber 26 can provide a number of functions. Example functions include: a) power conversion (e.g., DC-DC and/or AC-DC power conversion); b) power regulation; c) electrode polarity switching; d) periodically terminating power to the electrodes and connecting the electrodes together and to a zero reference voltage; e) isolating the circuitry from boat ground; f) gas sensing; g) regulating the current across the electrodes to provide current thru the electrodes; h) monitoring water flow through the biocide-generating unit 20; and i) and adjusting the magnitude of the electrical current flowing across the electrodes based on the water flow through the first chamber 24. To coordinate and implement this various functionality, the circuitry 27 can include a controller (e.g., controller 248) having one or more processors. The processors can interface with software, firmware, and/or hardware. Additionally, the processors can include digital or analog processing capabilities and can interface with memory (e.g., random access memory, read-only memory, or other data storage). In certain examples, the processors can include a programmable logic controller, one or more microprocessors, or like structures. The processors can also interface with displays 252 (e.g., indicator lights, etc.) and user interfaces 250 (e.g., control buttons, switches, etc.) mounted at an exterior of the unit housing 22.

Figure 4:
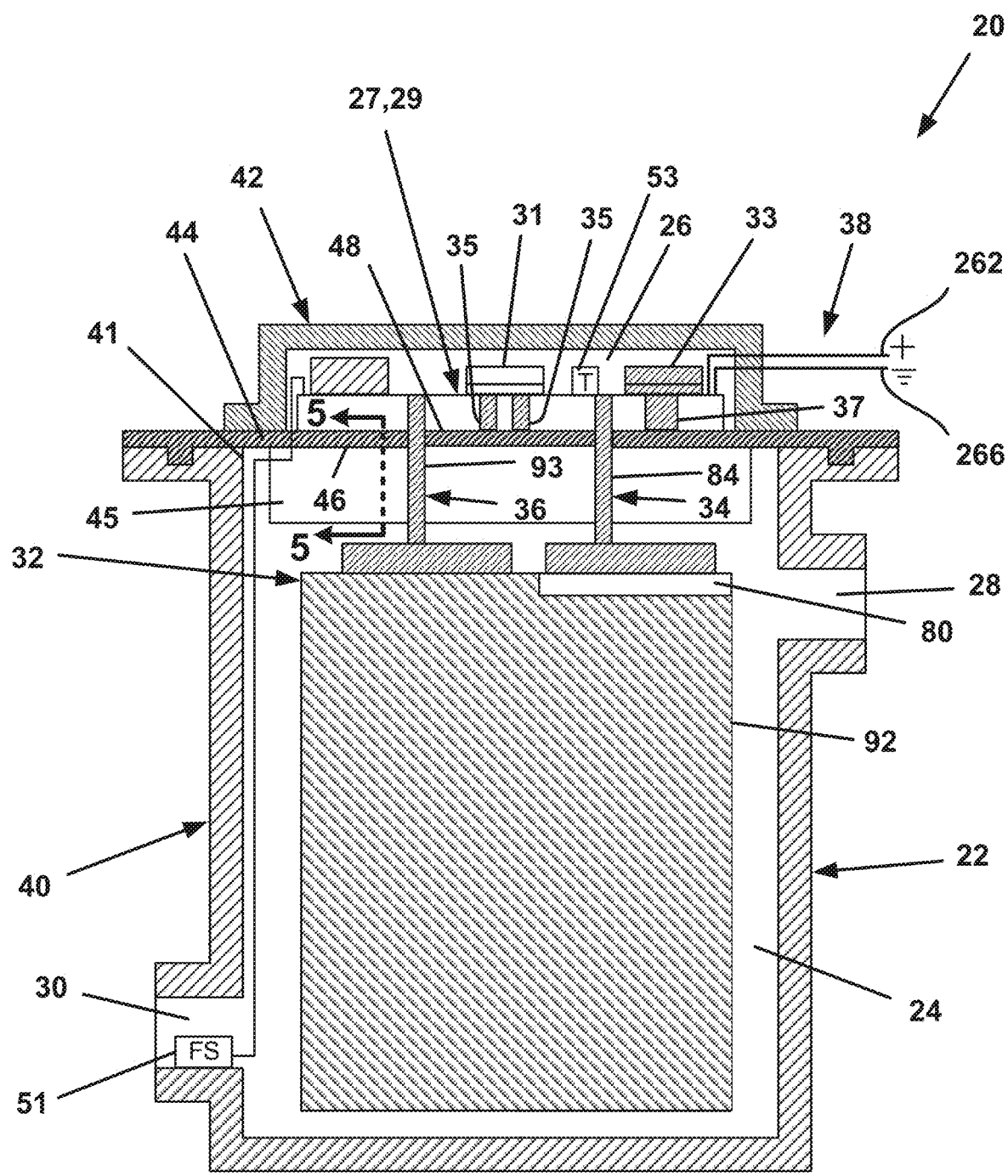
FIG. 4 is a cross-sectional view showing an example heat transfer arrangement (e.g., an example heat sink configuration) for the biocide-generating device of FIGS. 1-2.

Referring to FIG. 4, the unit housing 22 includes a main housing body 40 defining the first chamber 24. The main housing body 40 has an open end 41. The unit housing 22 also includes a housing cover 42 that mounts over the open end 41 of the main housing body 40 to enclose the first chamber 24. The housing cover 42 can attach to the main housing body 40 by fasteners such as bolts 43 (see FIG. 1). The second chamber 26 is defined within the housing cover 42. The second chamber 26 can optionally be re-enterable and can include an access panel or door for accessing the interior of the chamber 26. The housing cover 42 includes a base wall 44 having first and second opposite surfaces 46, 48. The second surface 48 is an upper surface that defines a portion (e.g., a base portion) of an interior of the second chamber 26 and is exposed to the interior of the second chamber 26. The first surface 46 is a bottom surface and is adapted to oppose and enclose the open end 41 of the main housing body 40 when the housing cover 42 is mounted on the main housing body 40. With the housing cover 42 mounted to the main housing body 40, the first surface 46 defines a top of the first chamber 24 and is exposed to an interior of the first chamber 24. Thus, the base wall 44 forms a common wall that separates the first and second chambers 24, 26 when the housing cover 42 is mounted on the main housing body 40.

Referring back to FIG. 2, the circuitry 27 can include a controller 248 which is shown interfacing with the user interface 250, the display 252, a sensing circuit 254, a cell power circuit 256, and an isolation circuit 258. The sensing circuit 254 can be configured to detect/sense the accumulation of gas within the first chamber 24. The cell power circuit 256 can be configured to supply electrical power to the first and second electrodes 34, 36. In one example, the cell power circuit 256 includes a current source 160 for driving a current through the electrolytic cell which is not dependent upon the load across the electrodes or the applied voltage. The magnitude, frequency and polarity of the current provided by the current source can be varied by the controller to regulate the amount of biocide generated by the system. The isolation circuit 258 transfers power from a power source 262 to the circuitry 27 and concurrently provides the circuitry 27 with a zero voltage reference that is electrically isolated from a boat ground 266. Further details of sensing circuitry, power circuitry, isolation circuitry and polarity switching circuitry are described in U.S. patent application Ser. No. 16/152,176, which is hereby incorporated by reference in its entirety. U.S. application Ser. No. 16/843,328, filed Apr. 8, 2020, is also hereby incorporated by reference in its entirety.

In certain examples, the sensing circuit 254 of the biocide-generating system 24 can be configured for detecting the accumulation of gas within the housing 52. A preferred gas sensor for the sensing circuit 254 includes a gas sensing electrode 130 that senses the presence of collected gas based on the difference in electrical conductivity between sea water and gas. In certain examples, the sensing circuit 254 senses electrical connectivity between the gas sensing electrode 130 and another component of the electrolytic cell. In one example, electrical connectivity is sensed between the gas sensing electrode 130 and either the first terminal 78 or the second terminal 90.

The isolation circuit 258 is configured for electrically isolating the power source 262 from the electrical components of the biocide-generating system 24. For example, the isolation circuit 258 can transfer electrical power from the power source 262 to the biocide-generating device 20 in a manner where the biocide-generating device 20 is provided with the zero voltage reference 264 that is not electrically connected to (i.e., is electrically isolated from) the boat ground 266 of the watercraft 20. In one example, the isolation circuit 258 inductively transfers electrical power to the biocide-generating device 20 via a transformer that may include inductive coils. In an example embodiment, the isolation circuit 258 is implemented using a VHB100 W DC-DC converter available from CUI, Inc. of Tualatin, Oregon Other isolation circuits, including other types of DC-DC converters having different voltage thresholds, are useable as well. A voltage regulator can regulate electrical power provided to the controller 248, the display 252 and other lower power components of the system.

To precisely control the amount of biocide generated at the electrode arrangement 72, it is preferred for a constant current source to be used to cause electrical current to flow between the first electrode 74 and the second electrode 76 for driving the electrolysis reaction. In certain examples, the cell power circuit 256 includes the current source 160 (see FIG. 2). In certain examples, the controller 248 can control the current source 160 via a control line to vary the electrical current flowing between the first and second electrodes 74, 76 based on a water flow through the electrolytic cell (e.g., a volumetric flow rate, mass flow rate). The water flow can be determined by a reading from the flow sensor 51 (e.g., a flow meter) or other means. Example flow sensors can include volumetric flow meters such as positive displacement flow meters, velocity flow meters, hall-effect flow meters (e.g., electrode paddle wheel flow meter) mass flow meters and inferential flow meters. A preferred flow meter can sense flow rate and flow direction (e.g., can distinguish between forward and reverse flow direction through the unit). A preferred flow sensor is a directional flow sensor (e.g., a flow sensor that can identify flow direction such as between forward and reverse direction) such as an ultrasonic flow meter. Depending upon the type of flow meter used, volumetric flow can be directly measured or calculated/estimated based on flow meter readings. In certain examples, the controller 248 can increase the magnitude of the electrical current with an increase in the water flow and decrease the magnitude of the electrical current with a decrease in the water flow so as to maintain a constant biocide concentration (or at least a biocide concentration within a target range) in the water discharged from the first chamber 26. It will be appreciated that the magnitude of the current provided to the electrode arrangement 32 can be modified based on water flow through the water system and other factors.

In certain examples, the controller 248 can use flow data (e.g., flow rate data from the flow sensor 51 or other source) to control the production of biocide during transient flow conditions such as during a flow stoppage event (e.g., when the pump turns off, a blockage occurs, etc.). In certain examples, the controller 248 can stop the production of biocide by terminating electrical power to the electrodes when a transient flow condition such as a flow stoppage is detected. In certain examples, the controller 248 is configured to sample water flow rates through the unit during operation of the unit continuously, or at least every half second, or at least every second, or at least every 2 seconds, or at least every 3 seconds or at least every 4 seconds so that flow transitions can be quickly detected and biocide generation can be modified accordingly. In certain examples the control system, via the controller 248 which interfaces with the flow sensor 51, is capable of detecting and distinguishing a direction of flow through the unit (e.g., detecting when water is flowing forwardly through the unit and detecting when water is flowing in a reverse direction through the unit with the control system being able to distinguish between forward flow and reverse flow (i.e., back flow)). In certain examples, the controller 248 stops biocide generation or prevents biocide generation from being initiated when reverse flow is detected. It has been determined that reverse flow may occur due to a siphoning effect and/or due to gravity when the seawater pump of the system is deactivated. The ability to sense direction of flow and as well as the frequent sampling of flow rate prevents conditions in which the system is unable to recognize that backflow is occurring and continues to produce chlorine even though pumping has been stopped.

In certain examples the control system, via the controller 248 which interfaces with the flow sensor 51, is capable of sensing water flow through the unit and stopping biocide production when a pre-determined decrease in flow occurs over a pre-determined time period. In one example, the control system stops biocide production when a decrease in water flow of at least 10, 15, 20, 25 or 30 percent occurs over a time period of no more than 10 seconds, 5 seconds, 4 seconds, 3 seconds, 2 seconds or 1 second. In certain examples, the pre-determined decrease in flow can be a specific amount such as at least 2 gallons per minute, or at least 1 gallon per minute over a predetermined time period such as 10 seconds, 5 seconds, 4 seconds, 3 seconds, 2 seconds or 1 second. In certain examples, the control system is configured to detect the pre-determined decrease in flow over the pre-determined time period prior to flow fully stops, and is capable of deactivating the electrolytic cell before flow fully stops through the flow line.

There are situations in which seawater pumps in watercraft are turned on and off as the watercraft cycles its air conditioner. It is desirable in these circumstances to rapidly turn off biocide production when the pump turns off and flow decreases and/or stops to prevent biocide concentration levels within the system from increasing above desired maximum levels. Control protocol in accordance with the principles of the present disclosure is beneficial for ensuring adequate production of biocide during normal pumping while preventing excessive biocide concentrations during flow reductions or reversals corresponding to sea water pumps being deactivated (e.g., during air conditioning cycling as air conditioners are cycles on and off).

Figure 6:
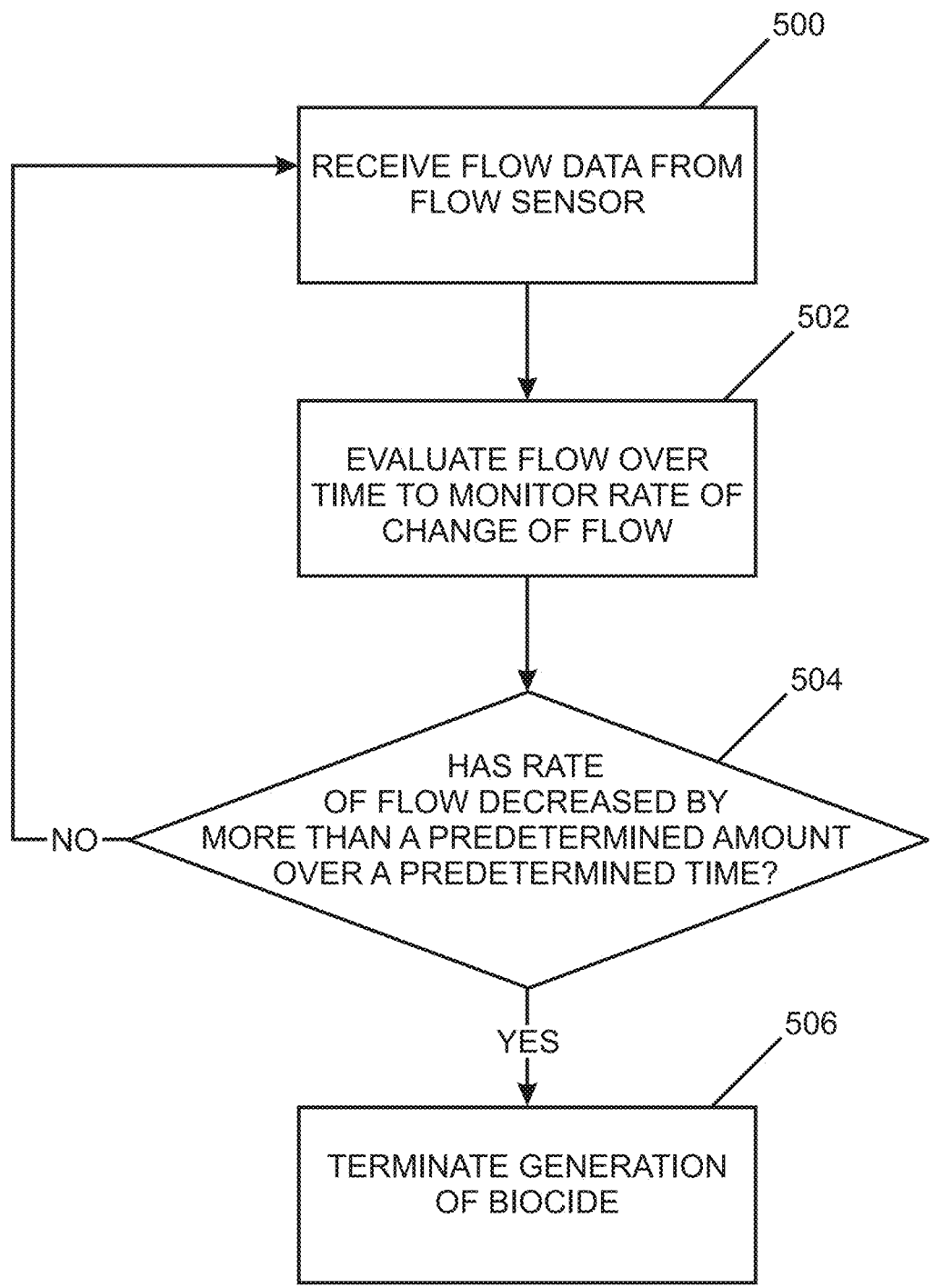
FIG. 6 is a flow chart illustrating control protocol that can be used by controls used to control biocide generating devices in accordance with the principles of the present disclosure.

FIG. 6 is a flow chart depicting control protocol logic for detecting a flow stoppage condition and for stopping the production of biocide to prevent high concentrations of biocide from being generated in the biocide-generating unit during transition periods in which water flow rapidly decreases. At step 500 flow data from the sensor 51 is received by the controller 248. At step 502, the controller 248 evaluates the sensed flow rate over time to monitor a rate of change of flow over time. At step 504, the controller 248 determines whether the rate of flow through the unit has decreased by more than a predetermined amount over a predetermined time period. The predetermined decrease in flow rate over the predetermined time is selected to be indicative of a flow stoppage in the system. If the rate of flow through the unit has not decreased by the predetermined amount over the predetermined time, the logic proceeds back to step 500. If the rate of flow through the unit has decreased by the predetermined amount over the predetermined time, the logic proceeds to step 506 where the controller 248 terminates power to the electrodes of the unit to terminate the generation of biocide within the unit.

Figure 5:
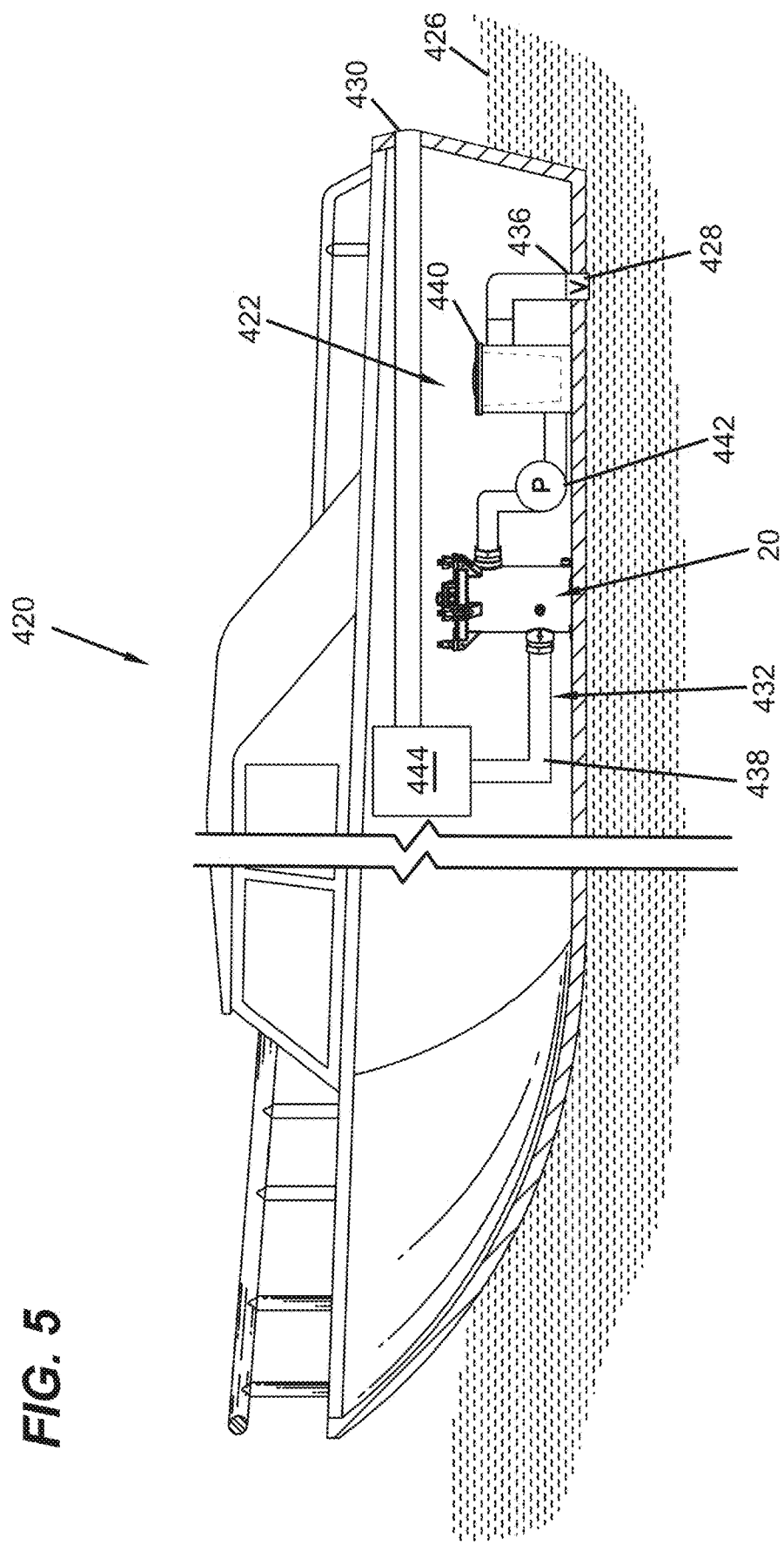
FIG. 5 illustrates a watercraft having an on-board water system incorporating the biocide-generating system of FIGS. 1-2.
Figure 7:
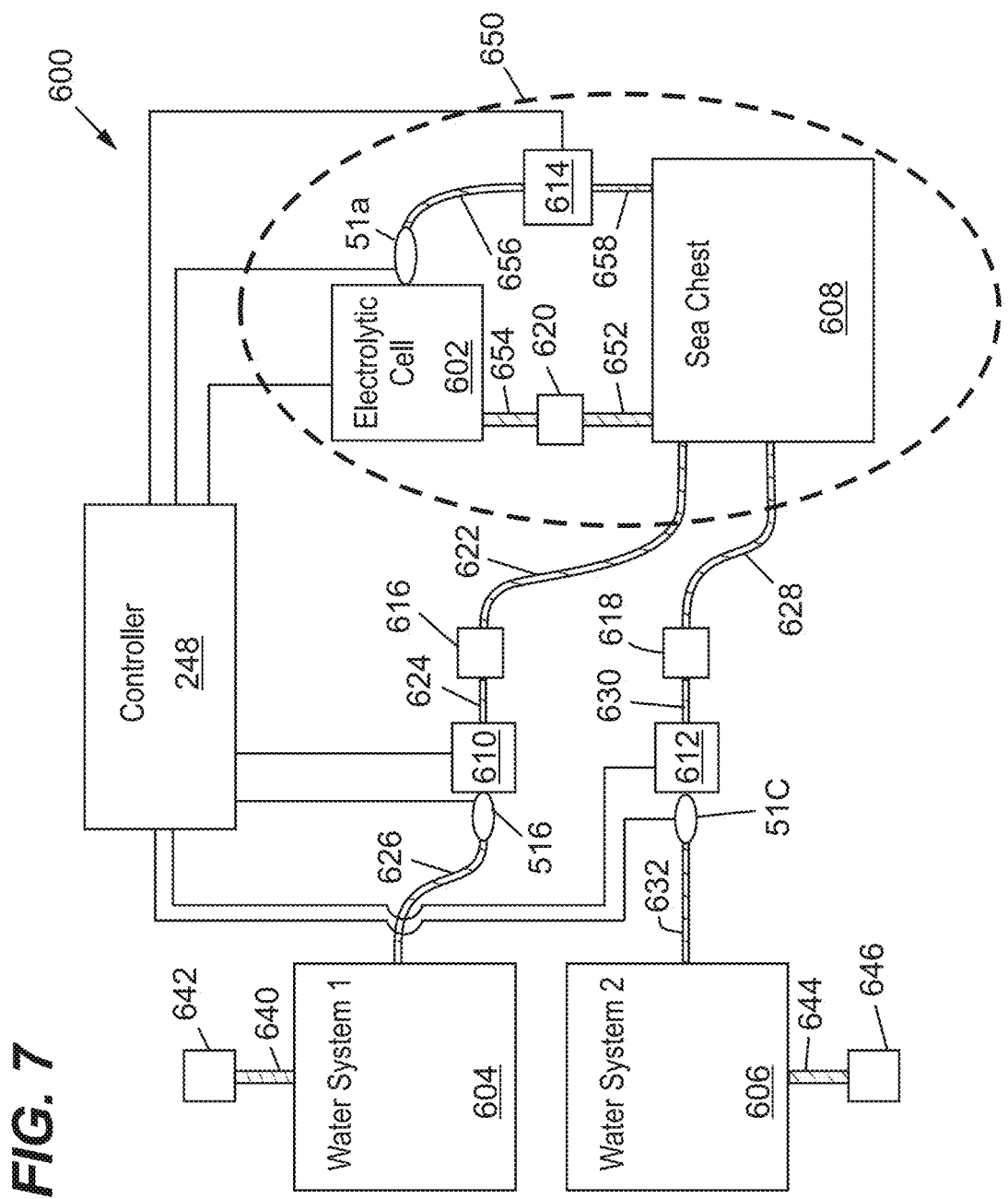
FIG. 7 is a schematic illustration of an embodiment of a water system of a watercraft using dynamic flow-sensed control in accordance with principles of the present disclosure.

FIG. 5 illustrates a watercraft 420 having an on-board water system 422 including the biocide-generating device 20 in accordance with the principles of the present disclosure. The watercraft 420 is shown supported on a body of water 426. The on-board water system 422 includes an inlet 428, an outlet 430, and a water flow path 432 that extends from the inlet 428 through the watercraft 420 to the outlet 430. The inlet 428 is configured for drawing water from the body of water 426 into the water flow path 432. The inlet 428 is located below a water line 434 of the watercraft 420 and is preferably located at a bottom of the hull of the watercraft 420. The inlet 428 can be opened and closed by a valve 436 such as a seacock. The outlet 430 is configured for discharging water that has passed through the water flow path 432 back to the body of water 426. Preferably, the outlet 430 is positioned above the water line 434. The on-board water system 422 can include a plurality of components positioned along the water flow path 432. The water flow path 432 can include a plurality of conduits 438 (e.g., hoses, tubes, pipes, etc.) which extend between the components of the on-board water system 422 and function to carry water along the water flow path 432 between the various components. As shown at FIG. 7, the depicted components include a water strainer 440, a pump 442, and one or more systems and/or equipment 444 that make use of water conveyed through the water flow path 432. The biocide-generating device 20 is adapted for generating a biocide within the water of the water flow path 432 while the water passes through the biocide-generating device 20. The biocide is configured for inhibiting biofouling within the conduits 438 and within one or more of the components positioned along the water flow path 432. It will be appreciated that the biocide can also be referred to as a disinfecting agent or a cleaning agent since the biocide can also include disinfecting and cleaning properties.

It will be appreciated that examples of the type of the systems and/or equipment 444 that can benefit from biocide treatment can include cooling systems such as air conditioners or chillers where water drawn from the body of water 426 can be used as a cooling media for cooling refrigerant of the cooling systems. In other examples, the water from the water flow path 432 can be used to provide engine cooling. In other examples, water from the water flow path 432 can be used for sanitation systems or watercraft propulsion systems.

In a preferred example, the biocide concentration in the electrolyte is maintained at a level sufficiently high to kill bio-matter and sufficiently low to avoid damaging corrosion within system. A preferred chlorine concentration is less than or equal to 2 ppm, or less than or equal to 1 ppm, or less than or equal to 0.5 ppm, or less than or equal to 0.3 ppm, or less than or equal to 0.2 ppm or in the range of 0.1-0.2 ppm.

In a preferred example, the biocide-generating system includes an adaptive dynamic control system that dynamically varies the magnitude of the current applied across the electrodes in direct proportion to the flow of water through the electrolytic cell. Thus, the rate of biocide production varies directly with the water flow through the system. The magnitude of electrical current used to provide a desired biocide concentration in the flow of water through the electrolytic cell for a given water flow can be determined by a method such as an algorithm or look-up table. The flow can be determined by the flow sensor 51, or can be determined based on the sensed temperature or the temperature rate of change of the control electronics in view of the electrical power level of rate of change of the electrical power level provided to the electrodes. In one example, the flow sensor 51 is integrated with/attached to the electrolytic cell. In one example, the flow sensor 51 can be mounted adjacent to the outlet of the electrolytic cell to prevent bio-growth from damaging or fouling the flow sensor. By dynamically controlling the rate of biocide generation, it is possible to maintain the concentration of biocide at a target level or within a target range regardless of the water flow.

FIG. 7 schematically illustrates a further embodiment of a system 600 that can be implemented onboard a watercraft. The system 600 includes water treatment components and features for treating one or more on onboard water systems of the watercraft. The example system 600 includes two such onboard water systems 604 and 606. However, water treatment features of the system 600 can be implemented for treating a single such water system, or more than two such water systems. The water systems 604 and 606 can be associated with different onboard equipment. For example, the water system 604 can be used for onboard air conditioning equipment, and the water system 606 can be used for onboard sanitation equipment.

The system 600 includes a sea chest 608 that is also onboard the watercraft. The sea chest 608 is in fluid communication with the body of water that buoyantly supports the watercraft. The sea chest 608 is a water supply container. The sea chest 608 holds a volume of water collected from the body of water. The water systems 604 and 606 draw from the collected sea chest water as needed.

The system 600 includes an electrolytic cell 602. The electrolytic cell 602 can be provided by a biocide-generating unit, such as the unit 20 (FIG. 4).

The system 600 includes a controller 248. The controller 248 can include the features and functionality of the controller 248 described above in connection with FIG. 2. The controller 248 is configured to control operation of the electrolytic cell 602 based on flow inputs received from flow sensors Ma, 51b and 51c. The flow sensors Ma, 51b and 51c of the system 600 can include the features and functionality of the flow sensor 51 described above in connection with FIG. 2.

The flow sensor 51a measures flow out of the electrolytic cell 602 and provides that flow data to the controller 248. The flow sensor 51b measures flow from the sea chest 608 to the water system 604 and provides that flow data to the controller 248. The flow sensor 51c measures flow from the sea chest 608 to the water system 606 and provides that flow data to controller 248.

The controller 248 also controls operation of the pumps 610, 612 and 614.

The pump 610, when activated, draws biocide-treated water from the sea chest 608 and supplies the drawn water to the water system 604 via fluid conduits (e.g., pipes) 622, 624 and 626. The pump 610 is active or inactive depending on the flow demands of the water system 604. The flow sensor 51b can be positioned at any appropriate location in the flow path between the sea chest 608 and the water system 604.

The pump 612, when activated, draws biocide-treated water from the sea chest 608 and supplies the drawn water to the water system 606 via fluid conduits (e.g., pipes) 628, 630 and 632. The pump 612 is active or in active depending on the flow demands of the water system 606. The flow sensor 51c can be positioned at any appropriate location in the flow path between the sea chest 608 and the water system 606.

Strainers 616, 618 and 620 are positioned in their respective flow paths to strain and collect debris from water being drawn from the sea chest. The strainer 616 strains water flowing from the sea chest 608 to the water system 604 before the water reaches the pump 610. The strainer 618 strains water flowing from the sea chest 608 to the water system 606 before the water reaches the pump 612. The strainer 620 strains water flowing from the sea chest 608 to the electrolytic cell 602 before the water reaches the pump 614 or the electrolytic cell 602.

Water used by the water system 604 is discharged from the watercraft via a fluid conduit 640 (e.g., pipes) that leads to a discharge outlet 642. Water used by the water system 606 is discharged from the watercraft via a fluid conduit 644 (e.g., pipes) that leads to a discharge outlet 646. The discharge outlets 642 and 646 can be the same discharge outlet.

Operation of the pump 614 is controlled by the controller 248. When the pump 614 is active, a flow loop 650 is established. Water flowing in the flow loop 650 flows from the sea chest 608 to the strainer 620 via fluid conduit 652 (e.g., pipes) and then to the electrolytic cell 602 via fluid conduit 654 (e.g., pipes), where the water is treated. The treated water then flows past the flow sensor 51*a* to the pump 614 via fluid conduit 656 (e.g., pipes), and back to the sea chest 608 via fluid conduit 658. The flow sensor 51*a* can be positioned at any appropriate location in the flow loop 650.

Activating and deactivating the pump 614 (by controller 248) to establish and disestablish the flow loop 650 regulates the concentration of biocide in the sea chest 608.

The controller 248 uses control logic to determine when to activate and deactivate the pump 614 to regulate the concentration of biocide in the sea chest 608. Control of the pump 614 is based on sensed flow provided to the controller by the one or more of the flow sensors 51*a*, 51*b* and 51*c*. Based on the flow readings from one or more the flow sensors 51*a*, 51*b* and 51*c*, control logic dictates when the controller 248 is activate and non-active.

The controller 248 can activate and deactivate the pump 614 in real time based on real time flow readings from one or more of the flow sensors.

Alternatively, the controller 248 can cause the pump to be active or inactive for predefined lengths of time. The predefined lengths of time can be based on one or more discrete flow readings from one or more of the flow sensors. Discrete flow readings can be taken periodically on a predefined schedule (e.g., based on typical water system usage during the course of a day), or in response to a stimulus such as a user command, or activation of a piece of electrical equipment (e.g., a compressor) associated with a water system.

In one example, the system 600 determines that biocide concentration in the sea chest 608 is in danger of dropping below a minimum acceptable threshold concentration based on water being drawn from the sea chest 608 to the water system 604 and/or the water system 606. The sensors 51*b* and 51*c* detect when water is being drawn or drawn at an increased volume per unit time by the respective water system 604, 606. These readings are fed to the controller 248. The controller then causes the pump 614 to activate to establish the flow loop 650 to generate more biocide and thereby maintain or increase the concentration of biocide in the sea chest, e.g., to replenish biocide being used up by the water demands of the water system 604 and/or the water system 606. In this example, the controller 248 causes the pump 614 to activate also based on a flow reading from the flow sensor 51*a* indicating that at the time of the positive flow reading(s) from the sensor(s) 51*b* and/or 51*c*, the pump 614 is inactive and the flow loop 650 is not established. Additionally, or alternatively, the controller 248 can set or increase the magnitude of electric current to the electrode arrangement that generates the electrolytic cell 602 to thereby generate the needed amount of biocide per unit time and thereby replenish biocide in the sea chest 608. Additionally, or alternatively, the controller 248 can set or increase the pumping power of the pump 614 to a level needed to replenish biocide in the sea chest 608.

In another example, the system 600 determines that biocide concentration in the sea chest 608 is in danger of dropping below a minimum acceptable threshold concentration based on water being drawn from the sea chest 608 to the water system 604 and/or the water system 606. The sensors 51*b* and 51*c* detect when water is being drawn or drawn at an increased volume per unit time by the respective water system 604, 606. These readings are fed to the controller 248. The controller then causes the pump 614 to remain in an active state to maintain a pre-existing established flow loop 650 to generate more biocide and thereby maintain or increase the concentration of biocide in the sea chest 608, e.g., to replenish biocide being used up by the water demands of the water system 604 and/or the water system 606. In this example, the controller 248 causes the pump 614 to activate also based on a positive flow reading from the flow sensor 51*a* indicating that at the time of the positive flow reading(s) from the sensor(s) 51*b* and/or 51*c*, the pump 614 is active and the flow loop 650 is pre-established. Additionally, or alternatively, the controller 248 can increase the magnitude of electric current to the electrode arrangement that generates the electrolytic cell 602 to thereby generate more biocide per unit time and thereby replenish biocide in the sea chest 608. Additionally, or alternatively, the controller 248 can set or increase the pumping power of the pump 614 to a level needed to replenish biocide in the sea chest 608.

In other examples, the system 600 determines that biocide concentration in the sea chest 608 is in danger of increasing beyond a maximum acceptable threshold concentration based on a lack of water being drawn from the sea chest 608 to the water system 604 and/or the water system 606. The sensors 51*b* and 51*c* detect when water is not being drawn or being drawn at a decreased volume per unit time by the respective water system 604, 606. These readings are fed to the controller 248. The controller then causes the pump 614 to deactivate or, as appropriate, remain in a deactivated state to, respectively, disestablish or maintain in a disestablished state, the flow loop 650 to stop generating biocide or generate less biocide and thereby maintain or decrease the concentration of biocide in the sea chest 608. The controller 248 causes the pump 614 to deactivate based on a flow reading from the flow sensor 51*a* indicating that at the time of the positive flow reading(s) from the sensor(s) 51*b* and/or 51*c*, the pump 614 is active and the flow loop 650 is pre-established. Alternatively, the controller 248 causes the pump 614 to remain in a deactivated stated based on a flow reading from the flow sensor 51*a* indicating that at the time of the positive flow reading(s) from the sensor(s) 51*b* and/or 51*c*, the pump 614 is inactive and the flow loop 650 is not pre-established. In addition, or alternatively, the controller 248 can increase the magnitude of electric current to the electrode arrangement that generates the electrolytic cell 602 to thereby generate more biocide per unit time. Additionally, or alternatively, the controller 248 can decrease the magnitude of electric current to the electrode arrangement that generates the electrolytic cell 602 to thereby generate less biocide per unit time to avoid over-treating the sea chest water with biocide. Additionally, or alternatively, the controller 248 can set or lower the pumping power of the pump 614 to a level needed to avoid over-treating the sea chest water with biocide.

As illustrated by the foregoing examples, according to the system 600, the controller 248 can regulate biocide concentration in the sea chest 608 by outputting control signals to one or more components implemented in the flow loop 650 based on one or more inputs. The inputs to the controller 248 are one or more flow measurements from one or more of the flow sensors 51*a*, 51*b* and 51*c*. The control signals that are output by the controller 248 are provided to one or more of the pump 614 and the electrode arrangement of the biocide-generating unit that generates the electrolytic cell 602. As appropriate and dictated by the control logic, these control signals turn the corresponding component on, turn the corresponding component off, increase power to the corresponding component, or decrease power to the corresponding component.

As further illustrated by the foregoing examples, the controller 248 can control the amount of biocide generation in the flow loop 650 based on a number of real-time factors. These factors include but are not limited to 1) whether the water system 604 is drawing water or not drawing water from the sea chest 608; 2) whether the water system 606 is drawing water or not drawing water from the sea chest 608; if the water system 604 is drawing water from the sea chest 608, the volume of water being drawn by the water system 604 per unit time; and 4) if the water system 606 is drawing water from the sea chest, the volume of water being drawing by the water system 606 per unit time. The duration of time water is being drawn by each water system are additional factors used by the controller to control biocide generation.

Additional factors can include the types of the water systems 604 and 606. For example, the water system 606 may be a type of water system that typically draws more water per unit time than the type of water system of the water system 604. In such an example, the controller 248 can be configured to, e.g., cause more biocide to be generated in a first scenario in which the water system 606 is detected to be drawing water and the water system 604 is detected to be not drawing water, than in a second scenario in which the water system 604 is detected to be drawing water and the water system 606 is detected to be not drawing water.

FIGS. 8-13 depict an example ultrasonic sensor unit 800 in accordance with the principles of the present disclosure. The ultrasonic sensor unit 800 is adapted for sensing flow information such as flow velocity and/or volumetric flow rate within systems in accordance with the principles of the present disclosure. It will be appreciated that the ultrasonic sensor unit 800 has a robust configuration that allows the sensor unit to be used in corrosive environments such as saltwater environments. In one example, the ultrasonic sensor unit 800 can be mounted at an outlet port of a biocide-generating device such as at the water outlet 30 of the biocide-generating unit 20.

The ultrasonic sensor unit 800 includes a sensor housing 802 including a molded main body 804 and a cover 806. The molded main body 804 and the cover 806 can be manufactured of a polymeric material. Example polymeric materials include polycarbonate and nylon. In certain examples, the polymeric material is glass fiber reinforced polymeric material.

The molded body 804 includes a first fitting 808, a second fitting 810 and a flow passage 812 that extends through the molded body 804 between the first and second fittings 808, 810. The molded body 804 also includes a control chamber 814 separated from the flow passage 812. The control chamber 814 includes a main region 816 and first and second sensor pockets 818, 820. The first and second sensor pockets 818, 820 are defined respectively by first and second portions 822, 824 of the molded body 804 that project into the flow passage 812. The first and second sensor pockets 818, 820 are fluidly isolated from the flow passage 812 by the molded body 804 (e.g., by the first and second portions 822, 824 of the molded body 804). The first and second pockets 818, 820 are located on opposite sides of the flow passage 812 with the first and second pockets 818, 820 being located upstream/downstream from one another with respect to a flow direction 813 of flow through the flow passage 812.

Figure 8:
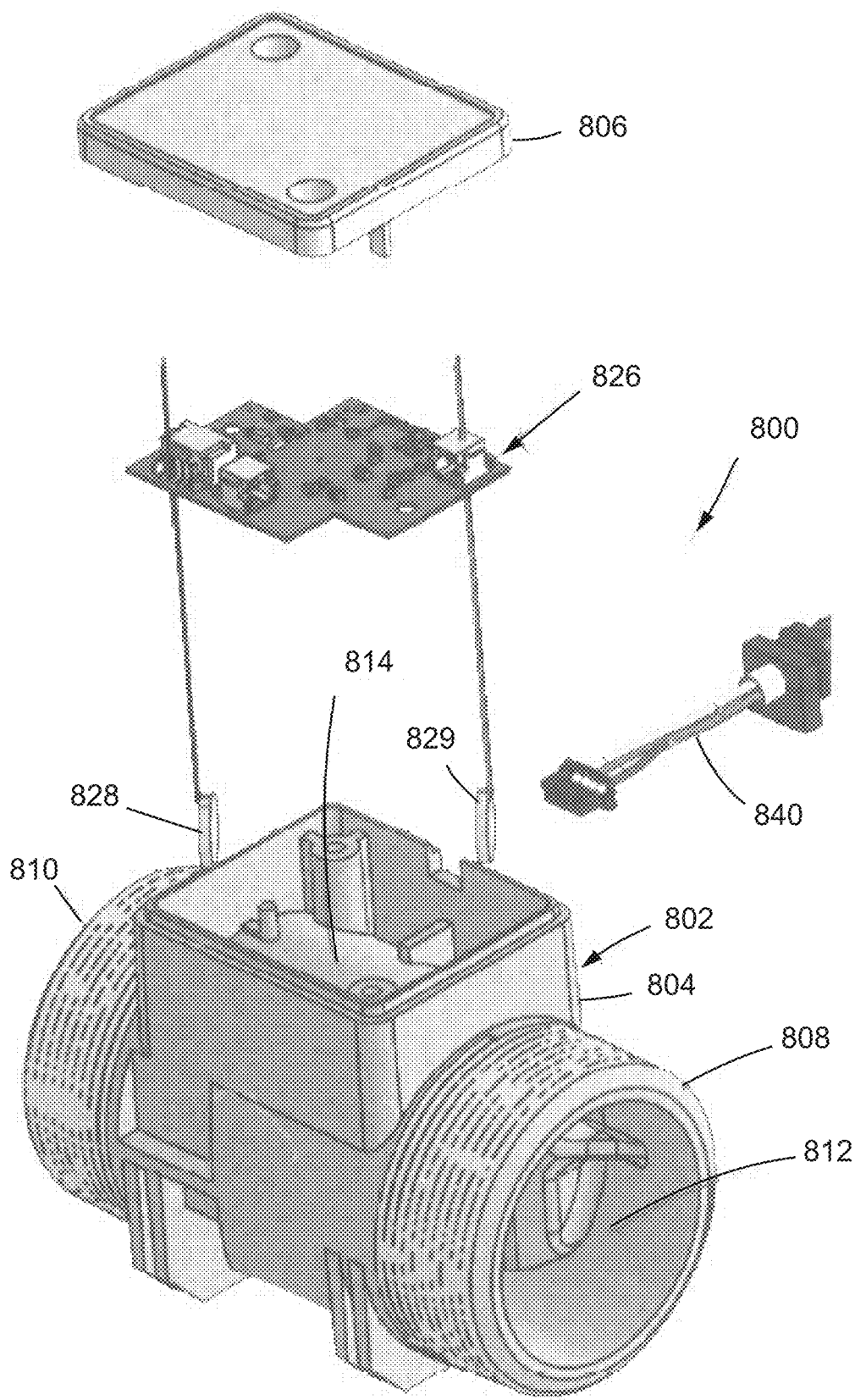
FIG. 8 is an exploded view of an ultrasonic sensor unit suitable for use in sensing flow within systems in accordance with the principles of the present disclosure.
Figure 9:
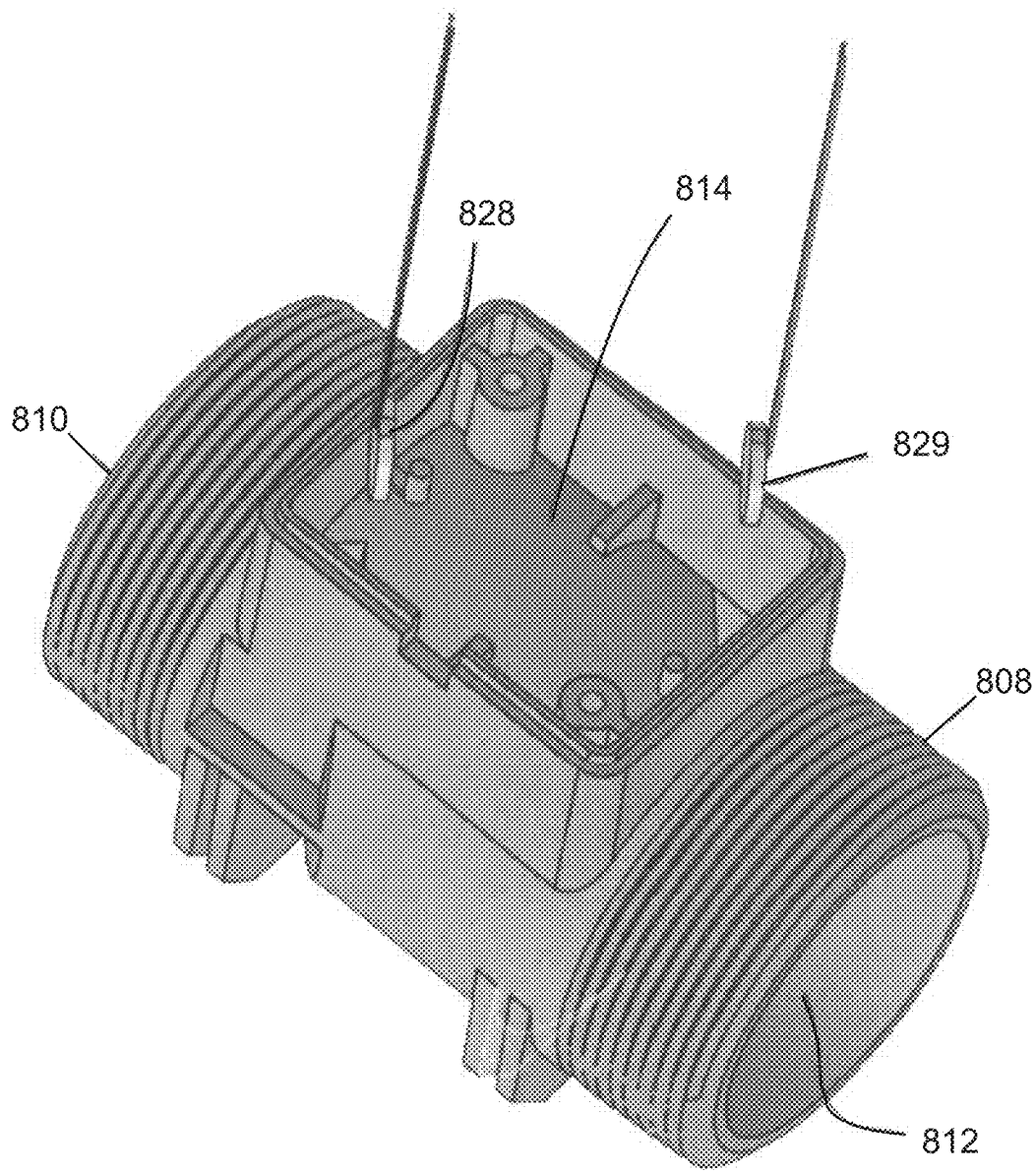
FIG. 9 depicts the ultrasonic sensor unit of FIG. 8 with ultrasonic sensors of the sensor unit exploded outwardly from pockets within a sensor housing of the sensor unit.
Figure 10:
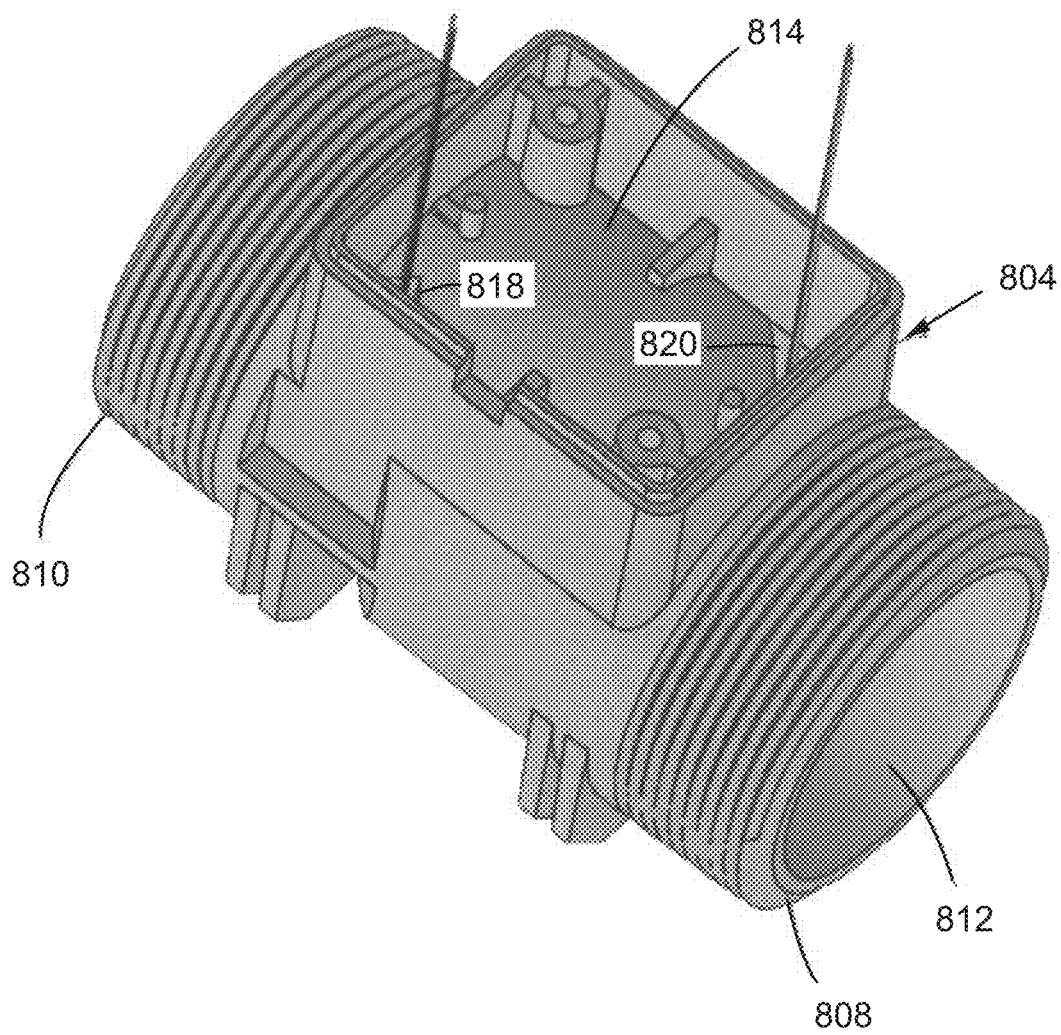
FIG. 10 depicts the ultrasonic sensor unit of FIG. 9 with the ultrasonic sensors located within the pockets of the sensor housing of the ultrasonic sensor unit.
Figure 11:
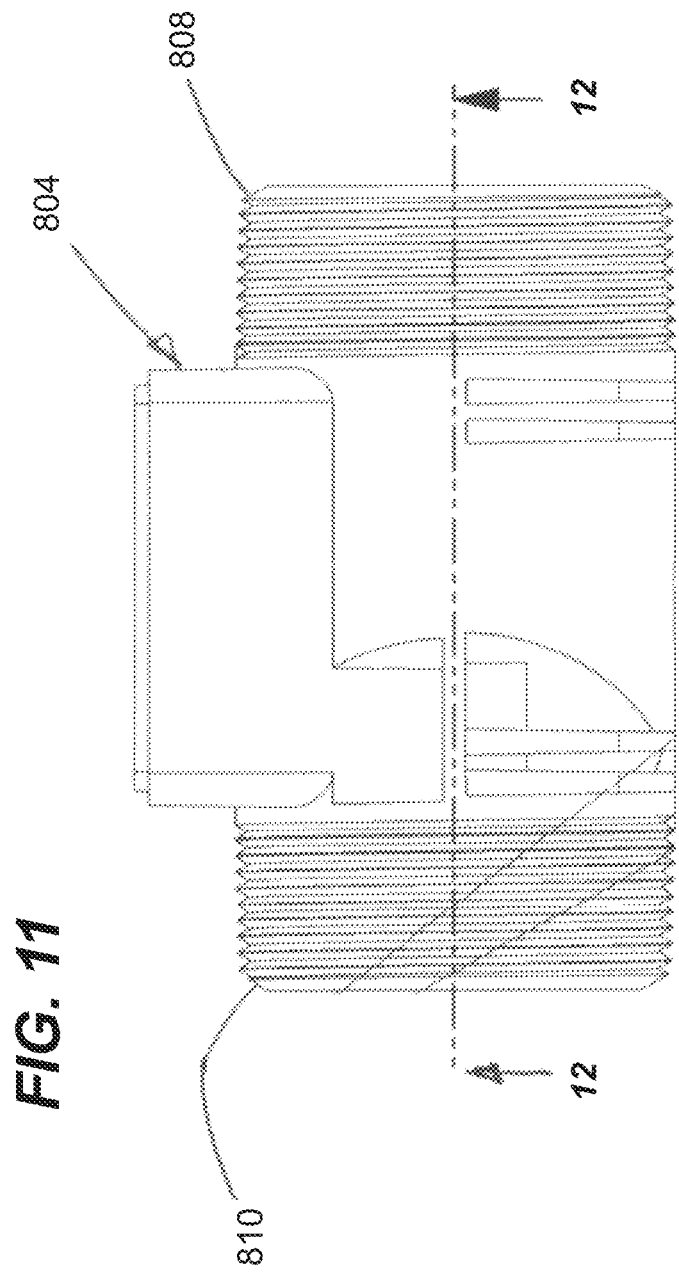
FIG. 11 is a side view of the sensor housing of the ultrasonic sensor unit of FIGS. 8-10.
Figure 12:
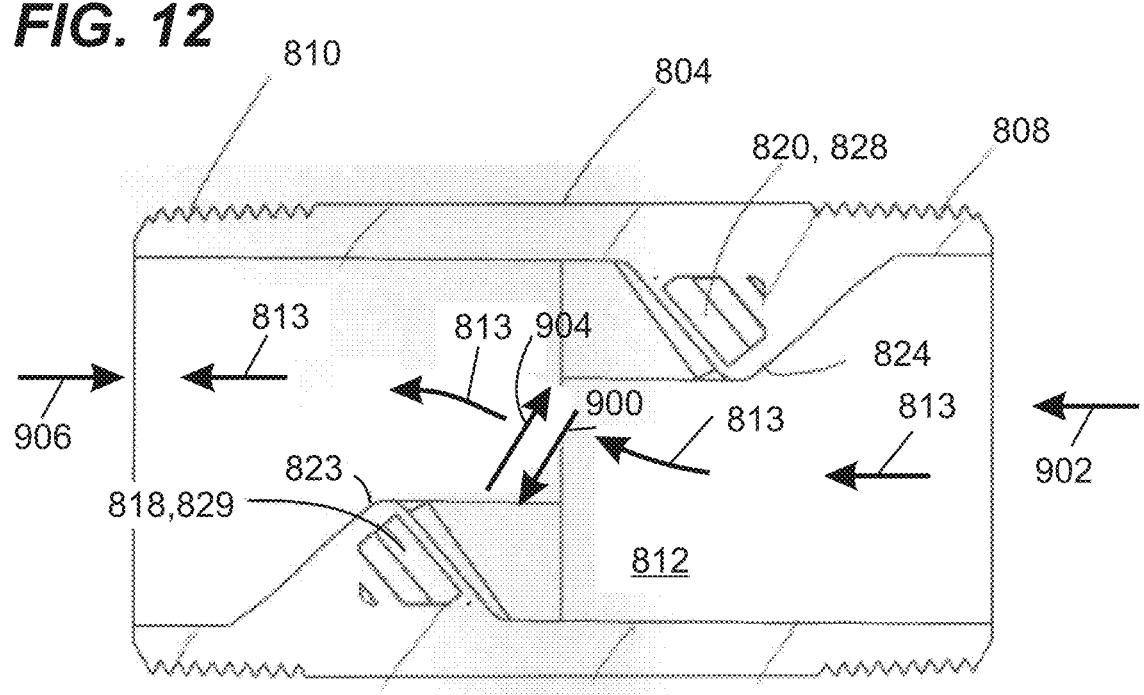
FIG. 12 is a cross-sectional view taken along section line 12-12 of FIG. 11.
Figure 13:
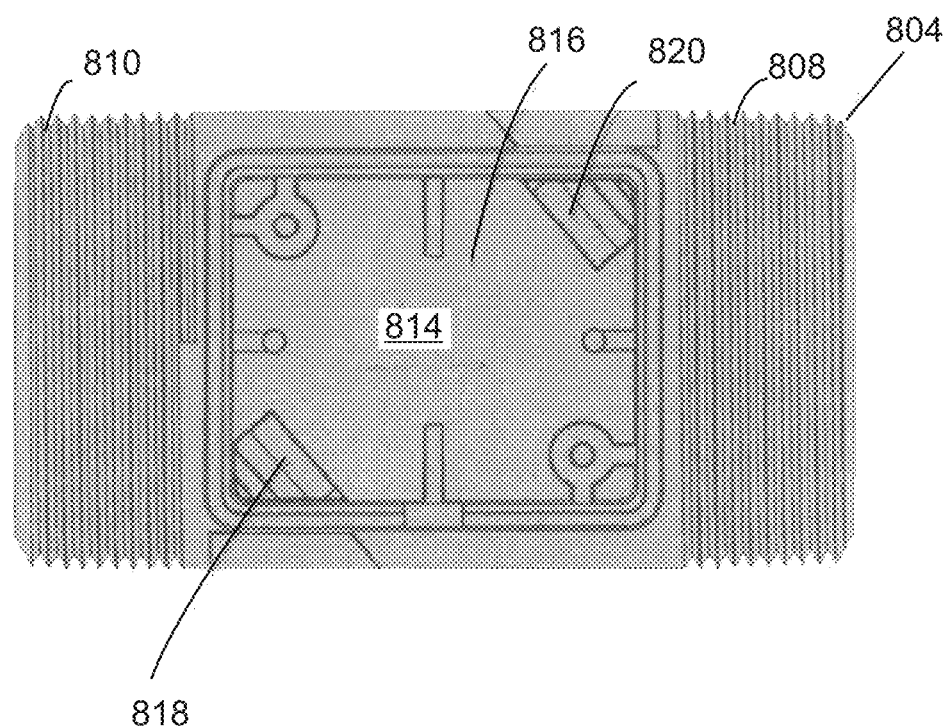
FIG. 13 is a top view of the sensor housing of the ultrasonic sensor unit of FIG. 8 with the circuit board of the sensor unit and the cover of the sensor housing removed.

Referring to FIG. 8, an electronic controller 826 is positioned within the main region 816 of the control chamber 814. The electronic controller 826 can include a circuit board 827 on which one or more electronic processors can be mounted. The electronic controller can be capable of accessing memory and processing data. The controller 826 can also be capable of sending and receiving signals to and from corresponding first and second ultrasonic sensors 828, 829. In certain examples, the electronic controller can include a programmable logic controller, one or more microprocessors, or like structures. The controller can include digital or analog processing capabilities and can interface with memory (e.g., random access memory, read-only memory, or other data storage). The controller can run algorithms including formulas or empirical data used to generate flow-related information (e.g., velocity, volumetric flow rate) based on sensed readings generated by the ultrasonic sensors 828, 829. In one example, the ultrasonic sensors 828, 829 are piezo-electric sensors including piezo-electric crystals.

The first and second ultrasonic sensors 828, 829 are respectively positioned in the first and second pockets 818, 820. The first and second sensors 828, 829 are adapted to generate and receive sonic signals transferred through fluid flowing through the flow passage 812. The controller 826 is adapted to interface with the first and second ultrasonic sensors 828, 829 to control generation of the sonic signals and to monitor receipt of the sonic signals for use in determining flow velocity within flow passage 812 by differential time methodology using a corresponding algorithm. The controller can calculate volumetric flow rate based on the sensed flow velocity and the cross-sectional area of the flow path 812.

In one example, the first fitting 802 represents a flow input side of the sensor unit 800 and the fitting 804 represents a flow output side of the sensor unit 800. In one example, the first fitting 802 can be coupled to an outlet port of a biocide generating device. For example, the first fitting 802 can be coupled to the water outlet 30 of the biocide generating unit 20 described herein. In certain examples, the first and second fittings 808, 810 can be threaded. As depicted, the first and second fittings 808, 810 include outer threads, but in other examples could include inner threads. In one example, the first fitting 808 is threaded into the water outlet 30 of the biocide generating unit 20 to allow the ultrasonic sensor unit 800 to sense flow through the biocide generating unit 20.

It will be appreciated that by separating the flow passage 812 from the control chamber 814 the material of the molded main body 804 protects the sensors 828, 829 and the electronic controller 826 from the corrosive effects of the liquid flowing through the flow passage 812 (e.g., saltwater). In certain examples, potting material such as epoxy can be used to fill the control chamber 814 around the sensors 828, 829 and the electronic controller 826 to provide sealing of the control chamber 814 and to fix the sensors 828, 829 and the electronic controller 828 within the control chamber 814. After the potting material has been applied within the control chamber 814, an access opening of the control chamber 814 can be covered by the cover 806. A control cable 840 can be routed into the control chamber 814 prior to potting of the various components and can be electrically connected to the controller to provide power and to provide the transfer of data and control signals to and from the controller to remote locations (e.g., to the controller 248).

As described above, data from the sensors 828, 829 can be used to determine an average velocity of the water flowing through the flow passage 812 of the housing 802 using differential time methodology. For example, the first sensor 828 can be excited (e.g., excited at 1 to 2 megahertz) to generate first ultrasonic signals 900 (e.g., sinusoidal pulses)

that travel through the flow passage 812 in a first direction 902 (e.g., a downstream direction) and act on the second sensor 829 causing the second sensor 829 to generate first electrical signals representative of the first ultrasonic signals 900. The first electrical signals are captured using an analog to digital converter and saved in memory. Similarly, the second sensor 829 can be excited (e.g., excited at 1 to 2 megahertz) to generate second ultrasonic signals 904 (e.g., sinusoidal pulses) that travel through the flow passage 812 in a second direction 906 (e.g., an upstream direction) and act on the first sensor 828 causing the first sensor 828 to generate second electrical signals representative of the second ultrasonic signals 904. The second electrical signals are captured using the analog to digital converter and saved in memory. It will be appreciated that since the first signals 900 travel with the flowing water and the second signals 904 travel against the flowing water, the first signals 900 have a higher velocity than the second signals 904. For this reason, the first signals 900 have a shorter travel time (i.e., flight time) from the first sensor 828 to the second sensor 829 as compared to the travel time of the second signals 904 from the second sensor 829 to the first sensor 828. Based on the difference in travel time between the first and second signals 900, 904, an average velocity of the water flowing through the flow passage can be determined. Once the average velocity is determined, the flow can be determined based on the cross-sectional area of the flow passage 812.

Figure 14:
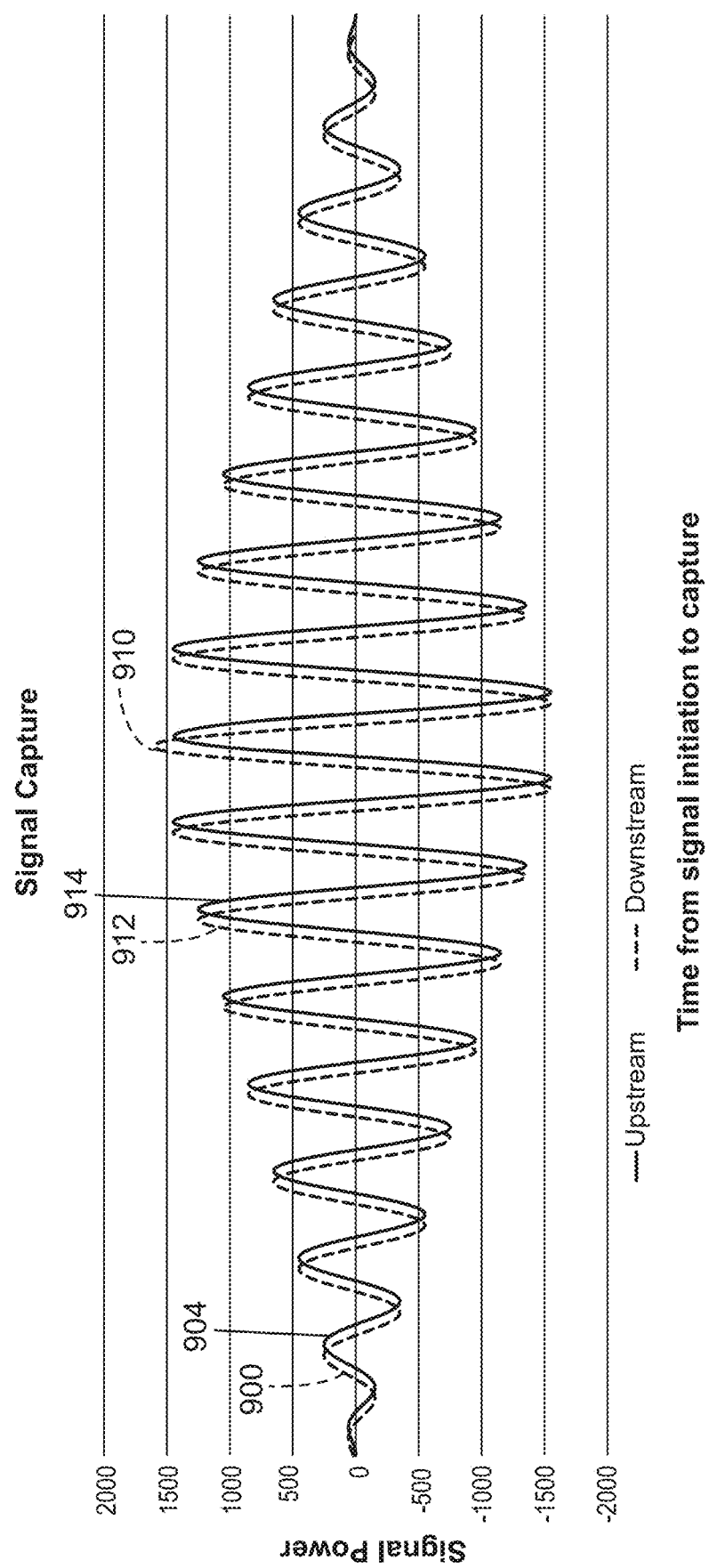
FIG. 14 is a graph plotting pulse signatures of signal captures of upstream and downstream ultrasonic signals.

To determine the difference in travel time between the first and second signals 900, 904, the pulse signatures of the first and second signals 900, 904 are compared. For example, FIG. 14 depicts the pulse signatures of the first and second signals 900, 904 plotted on a graph in which the x-axis represents the capture time from signal initiation (i.e., the signal travel time) and the y-axis represents the signal magnitude. To determine the difference in travel time, the capture times of the same pulses of the first and second signals 900, 904 are compared. To perform this comparison, the maximum pulse 910 of the pulse signature of the first signal 900 is identified. Next, a pulse 912 located before the maximum pulse 910 is selected based on a target percentage (e.g., a pulse having a peak having a magnitude in the range of 30-70 percent of the magnitude of the peak of the maximum pulse). Next, the capture time of the selected pulse 912 is stored in memory. Next, a pulse 914 of the pulse signature of the second signal 904 is selected. The selected pulse 914 is the pulse of the second signal 904 having a peak with a capture time closest to the capture time of the selected pulse 912 of the first signal 902. The capture time of the selected pulse 914 is saved in memory. The difference in capture times between the peaks of the selected pulses 912, 914 is used by the controller to represent the difference in travel time between the two signals 900, 904.

Figure 15:
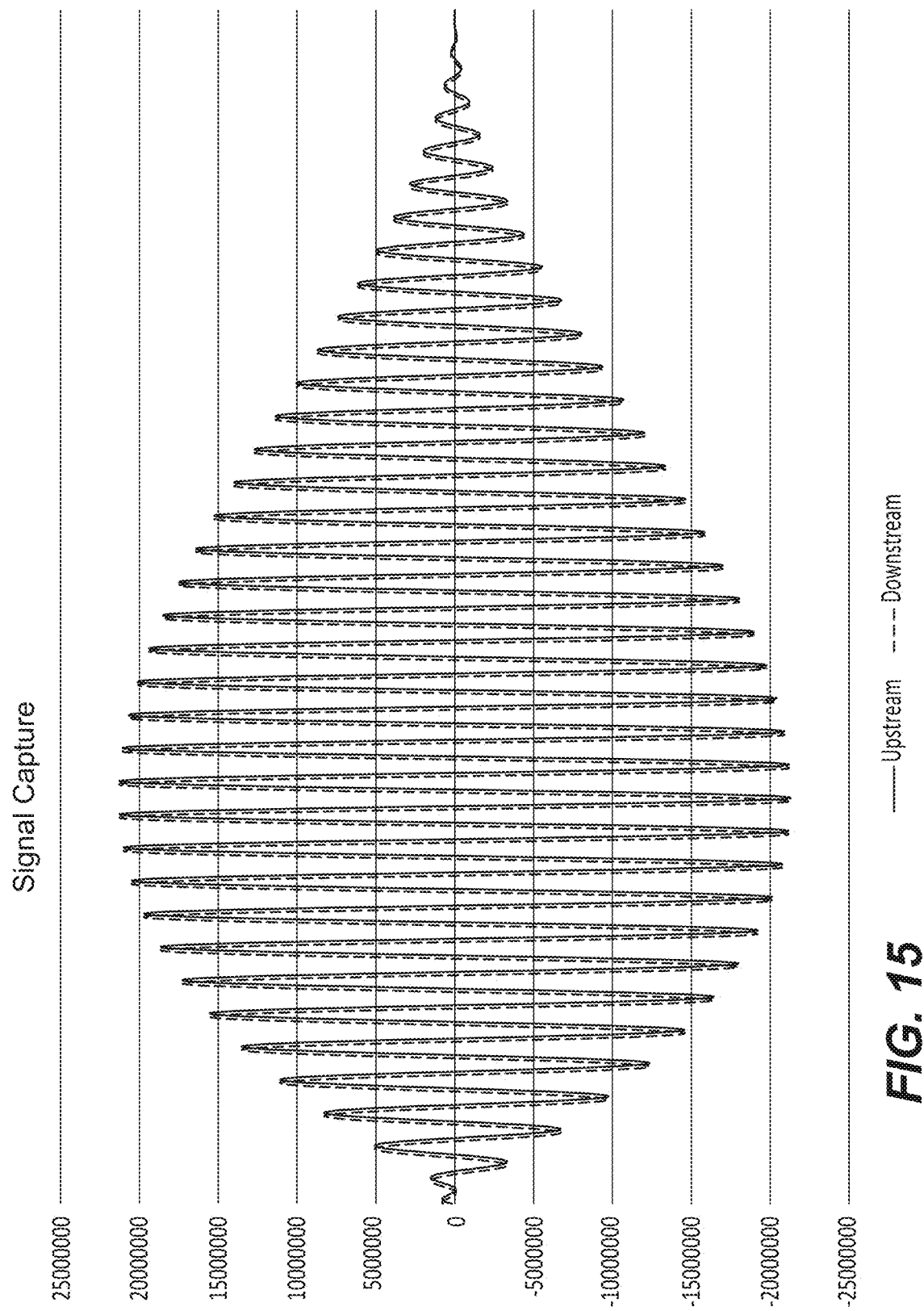
FIG. 15 is another graph plotting pulse signatures of signal captures of upstream and downstream ultrasonic signals.

In FIG. 14, the distance between the peaks of the pulse signatures of the first and second signals 900, 904 is exaggerated for explanation purposes. FIG. 15 shows that in actual practice the overlays of the pulse signatures of the signals 900, 904 can be extremely close to one another.

In alternative examples, to determine the difference in travel time, the capture times of the same pulses of the first and second signals 900, 904 are compared by: a) selecting a first pulse from the first signal; b) identifying the capture time of the peak of the selected first pulse; c) identifying a second pulse from the second signal that has a capture time closest to the capture time of the selected first pulse from the first signal; d) using the difference in capture times between the selected first and second pulses to represent the difference in travel time between the first and second signals when assessing (e.g., calculating, determining, etc.) flow using differential time methodology. It will be appreciated that the selected first pulse from the first signal could be the pulse with the maximum peak, or could be a pulse before or after the pulse with the maximum peak.

In operation of electrolytic cells in accordance with the principles of the present disclosure, the polarity is regularly alternated between the electrodes to reduce scaling. Thus, the electrolytic cell will alternatingly operate at first and second polarities. The electrolytic cell operates at each of the first and second polarities for a set duration before shifting to the other polarity. A brief pause in generating biocide occurs at the time of each polarity shift before initiating the next duration of biocide generation. Once a polarity shift has occurred and the next duration of biocide generation has been initiated, the biocide production of the electrolytic cell gradually increases over the time of the duration. As the amount of biocide generated by the electrolytic cell increases, the amount of gas generated as a result of the biocide generation reaction also increases thereby causing an increased amount of gas entrained in the water flowing downstream from the electrodes past the sensor (i.e., the amount of gas bubbles present in the water flowing past the sensor increases as the biocide production increases). Gas entrained in the water interferes with the signals 900, 904 causing a reduction in signal quality (e.g., a reduction in signal strength). The amount the entrained gas interferes with signal quality increases as the amount of entrained gas in the water increases.

Over the course of an operating period of the electrolytic cell, the amount of gas generated by the electrodes will affect the signal strength (e.g., the peak heights of the maximum pulses of each signal capture) of the captured ultrasonic signals. The controller can use averaging (e.g., calculating moving averages such as exponential moving averages) to assist in evaluating signal strength (e.g., derived from the peak heights of the maximum pulses of the captured signals) and in evaluating flow rate determined based on the captured signals. In some examples, the flow rate used by the controller to control the electrical current provided to the electrodes as well as to determine when to deactivate the electrolytic cell is based on the calculated flow rate moving average which can be referred to as the flow rate output moving average. The calculated flow rate output moving average is preferably an exponential moving average.

A moving average is an average of readings that moves over time as new sample readings are progressively added into the average over time. In the case of an exponential moving average, weighting factors are applied to the readings of the average which exponentially discount older sample readings of the average as compared to newer sample reading added into the average. In certain examples, new readings added to the moving average can be further weighted based on different factors to either emphasize or discount the new readings. Aspects of the present disclosure relate to using signal strength of the captured signals as a basis for weighting flow rate values of the captured signals when the flow rate values are added into the flow rate output moving average. In certain examples, signal strength can be determined as a moving average (e.g., an exponential moving average) of the maximum pulse values of each signal captured. Flow rates added into the flow rate output average are weighted more heavily when the moving average of the signal strength at the capture time of the data used to calculate the new flow rate is indicative of good signal strength as compared to when the moving average of the signal strength at the capture time of the data used to calculate the new flow rate is indicative of a poor signal strength.

When the moving average of the signal strength is above a determined level and is evaluated to be stable, the signals can be construed as good signals and the system can be construed as operating in a good signal state. Good signals typically would occur at the start of a biocide generation duration when gas generation is relatively low or during polarity shifts where power is not being supplied to the electrolytic cell. When the moving average of the signal strength is below a second level, the signals can be construed as poor signals and the system can be construed as operating in a poor signal state. This might occur at the end of a biocide generation duration when gas generation is relatively high.

In certain examples, the system uses the rate of change of the moving average of the signal strength as well as the magnitude of the moving average of the signal strength to assess the signal reliability and thus the weighting to be assigned to a sensed signal reading when calculating the flow rate output moving average. In certain examples, if the magnitude of the moving average of the signal strength is below a certain minimum level (which may be determined and set based on empirical data) at the time a reading is sensed, the reading will be evaluated to be unreliable and will not be used when calculating the flow rate moving average. In one example, the minimum level can be based on a level in which signal noise makes the signal readings inconsistent or unreliable. In certain examples, if the moving average of the magnitude of the signal strength is above the certain minimum level, the stability of the magnitude of the moving average of the signal strength (e.g., as evaluated by the rate of change of the magnitude of the moving average of the signal strength which may be assessed by monitoring a ratio of fast and slow moving averages of the magnitude of signal strength) can be used to further assess the reliability and thus the weighting to be assigned to a sensed signal reading when calculating the flow rate moving average. In one example, if monitoring of fast and slow moving averages of the magnitude of the signal strength indicates that the fast and slow moving averages of the magnitude of the signal strength are moving apart (e.g., the slow moving average is becoming larger or smaller than the fast moving average) or have moved apart by a certain amount, the weighting to be assigned to a sensed signal reading when calculating the flow rate moving average can be varied accordingly. For example, if the fast and slow moving averages of the magnitude of the signal strength are equal or within a first range of being equal thereby indicating that the rate of change of the magnitude of the signal strength below a determined minimum value, the system can determine that the signal readings are stable and the values corresponding to sensed signals to be added to the flow rate moving average can be weighted move heavily. In contrast, if the fast and slow moving averages of the magnitude of the signal strength are not within the first range of being equal thereby indicating that the rate of change of the magnitude of the signal strength is above the determined minimum value, the system can determine that the signal readings are less stable and the values corresponding to sensed signals to be added to the flow rate moving average can be weighted less heavily. It will be appreciated that a sliding scale can be used in which the weighting of sensed signals to be added to the flow rate moving average are varied based on a level of transition of the moving average of the magnitude of the signal strength (e.g., low/no transition (e.g., stable signal strength), middle transition (e.g., fairly stable signal strength), higher transition (e.g., less stable but still usable signal strength).

It has been determined that flow rates derived from signals captured when the moving average of the signal strength is stable and above a certain magnitude are significantly more reliable than flow rates derived from signals captured when the moving average of the signal strength is not stable and/or is below a certain magnitude. Thus, it is desirable to use control logic that minimizes the effect on the flow rate output moving average of flow rates derived from signals captured when the signal strength is low and/or not stable and maximizes the effect on the flow rate output moving average of flow rates derived from signals captured when the signal strength stable and high. To achieve this objective, the control logic can be configured such that flow rates calculated from signals captured when the signal strength and stability is good are added into the flow rate output moving average with a higher weighting than flow rates calculated from signals captured when the signal strength and/or stability is poor. In some examples, flow rates calculated from signals captured when the signal strength is poor can be weighted zero to not affect the flow rate output moving average. During such periods of low signal strength, the flow rate output moving average calculated prior to the period of poor signal strength can be used by the controller as the real time flow output moving average of the system.

Different types of moving averages can be used to assist in evaluating signal strength and for identifying transitory periods in which the signal strength is in transition. For example, a signal strength slow moving average can be calculated using a first weighting for each captured signal strength and signal strength fast moving average can be calculated using a second weighting for each captured signal strength. Once again, the captured signal strengths can be the peak value of the maximum pulse of each captured signal. The first weighting can be less than the second weighting. Transitory periods can be detected by evaluating the ratio of the signal strength slow moving average and the signal strength fast moving average such that it is possible to determine whether the averages are moving away from one another (indicating transition) or are not moving away from one another (indicating stability). In one example, an amount the ratio of the fast and slow signal strength moving averages is above or below one can be indicative of a level of stability or transition of the moving average of the signal strength and can be used to weight signals added into flow rate output moving average.

Different types of moving averages can be used to assist in evaluating flow rate and for identifying transitory periods in which the flow rate is in transition. For example, a flow rate slow moving average can be calculated using a first weighting for each captured flow rate added into the flow rate slow moving average and a signal strength fast moving average can be calculated using a second weighting for each captured flow rate added into the flow rate fast moving average. Each captured flow rate is determined from a corresponding set of signal captures saved and processed by the controller. The first weighting is less than the second weighting. A deviation between the flow rate slow and fast moving averages is indicative of a flow transitory period. To allow the flow rate output moving average to rapidly respond and adjust to flow rate transitions, the captured flow rates added into the flow rate output moving average can be more heavily weighted when the controller determines the system is in a flow transitory period.

Under certain circumstances (low signal strength, calculation issues, noise, etc.), the controller may be unable to calculate a flow rate from a given set of saved signal captures. When this occurs, an error is generated. The controller can maintain an error count. The controller can add to the error count each time an error is encountered and can subtract from the count each time a set of signal captures is processed without error. If the error count reaches a predetermined maximum, the controller can declare a full system error and can report the flow rate output exponential average to be zero causing power to be terminated to electrodes of the electrolytic cell. Once a full system error is declared, the system can continue to acquire, save and analyze signal captures from the ultrasonic sensor and preferably will override the full system error and re-set a normal operating state once signal captures resume being processed without error. In certain examples, when the error count reaches an intermediate level, the controller uses the last known good flow rate output moving average until the maximum error count is reached or until signal captures resume being processed without error, whichever occurs first. It will be appreciated that the maximum error count can be adjusted based on the state of operation of the system. For example, when the system is operating in a state where the signal strength is good and stable, it is less likely for errors to occur as compared to when the system is operating in a state where the signal strength is poor. Hence, errors detected when the system is operating in a good, stable signal strength state can be indicative of a more serious issue than errors detected when the system is operating in a poor signal strength state (which typically would be the result of gas entrainment in the water passing through the sensor housing). To address this, when the system is operating in a state in which the signal strength is good and stable, the maximum error count can be set to a first level and when the system is operating in a state in which the signal strength is poor the maximum error count can be set to a second level. The first level is preferably lower than the second level.

In certain examples, the ultrasonic sensor unit 800 can be a separate component from the biocide generating unit 20 that provides flow related data to the controller of the biocide generating unit 20. In other examples, the ultrasonic sensor unit 800 can be integrated with the biocide generating unit 20. For example, the sensor housing 802 can be unitarily formed with the unit housing 22 (e.g., at the inlet or the outlet of the unit housing 22). In one example, the sensors 828, 829 can housed within the wall of the unit housing 22. In one example, the controller 826 can be separate from the controller 248 and can interface with the controller 248. In other examples, the functionality of the controller 826 can be implemented by the controller 248. In one example, both controllers 248, 826 can be housed within the same chamber of the unit housing 22. In one example, information used or accessed by the controller in providing power to the electrodes of the biocide generating unit 20 can be used to assess the reliability of ultrasonic flow sensor readings alone or in combination the other ways discussed herein for assessing reliability and weighting of ultrasonic flow sensor readings. For example, the amount of time the electrodes have been operated in a particular polarity state, whether the electrodes are in a period between polarity states, and the level of power being provided to the electrodes can be used to assist in evaluating the degree to which ultrasonic flow sensor reading should be relied upon and weighted when determining the flow rate output moving average. The various control logic used to generate ultrasonic pulses, sense the pulses, interpret the pulses, calculate pulse strength averages, assess flight time differentials and calculate flow information can be implemented/performed by the controller 826 and/or the controller 248.

The various examples described above are provided by way of illustration only and should not be construed to limit the scope of the present disclosure. Those skilled in the art will readily recognize various modifications and changes that may be made with respect to the examples illustrated and described herein without departing from the true spirit and scope of the present disclosure.

What is claimed is:

1. A biocide-generating system for inhibiting bio-fouling within a water system, the biocide-generating system comprising:
   a housing including a water inlet for receiving water from the water system and a water outlet for outputting water containing biocide to the water system;
   an electrode arrangement including first and second electrodes positioned in the housing for generating biocide in the water within the housing and
   an electrical power circuit for establishing a flow of electrical current between first and second electrodes of the electrode arrangement for generating the biocide in the water within the housing;
   a flow sensor for sensing water flow through the system; and
   a system controller that controls the electrical power circuit and interfaces with the flow sensor, wherein the flow sensor is integrated in an ultrasonic sensor unit located downstream of the water outlet of the housing, the ultrasonic sensor unit including:
   a molded body including a first fitting, a second fitting, and a flow passage that extends through the molded body between the first and second fittings, the molded body also including control chamber separated from the flow passage, the control chamber including a main region and first and second pockets, the first and second pockets being defined respectively by first and second portions of the molded body that project into the flow passage, the first and second pockets being fluidly isolated from the flow passage by the molded body, the first and second pockets being located on opposite sides of the flow passage with the first and second pockets being located upstream/downstream from one another with respect to a flow direction of flow through the flow passage;
   a sensor controller positioned within the main region of the control chamber that interfaces with the system controller; and
   first and second ultrasonic sensors respectively positioned in the first and second pockets, the first and second sensors adapted to generate and receive sonic signals transferred through the flow passage, and wherein the sensor controller is adapted to interface with the first and second ultrasonic sensors to control generation of the ultrasonic signals and to monitor receipt of the ultrasonic signals for use in determining flow velocity through the flow passage by differential time methodology.

2. The biocide-generating system of claim 1, wherein the first fitting couples to the water outlet of the housing of the biocide-generating system.

3. The biocide-generating system of claim 2, wherein the first fitting couples to the water outlet by a threaded connection.

4. The biocide-generating system of claim 1, wherein the molded body has material compositions including plastic.

5. The biocide-generating system of claim 4, wherein the material composition includes polycarbonate or nylon or glass fiber reinforcement.

6. The biocide-generating system of claim 4, wherein the plastic is reinforced by glass fibers.

7. A biocide-generating system for inhibiting bio-fouling within a water system, the biocide-generating system comprising:
    a housing including a water inlet for receiving water from the water system and a water outlet for outputting water containing biocide to the water system;
    an electrode arrangement including first and second electrodes positioned in the housing for generating biocide in the water within the housing; and
    an electrical power circuit for establishing a flow of electrical current between first and second electrodes of the electrode arrangement for generating the biocide in the water within the housing;
    a flow sensor for sensing water flow through the system, wherein the flow sensor is an ultrasonic flow meter; and
    a system controller that controls the electrical power circuit and interfaces with the flow sensor, wherein a processing device of the system controller and/or of a sensor controller and/or another controller of the system uses data from the ultrasonic flow meter to determine a rate of water flow through the housing, wherein the processing device captures first and second ultrasonic signals of the ultrasonic flow meter which travel through the water in first and second opposite directions, wherein one of the first and second directions is an upstream direction and the other of the first and second directions is a downstream direction, wherein the processing device captures a first pulse signature for the first ultrasonic signal and a second pulse signature for the second ultrasonic signal, wherein the processing device determines the rate of water flow based on a difference in travel time between the first and second signals, wherein to determine the difference in travel time capture times of the first and second ultrasonic signals are compared, wherein to compare the capture times of the first and second ultrasonic signals the processing device: a) identifies a maximum pulse of the first pulse signature; b) selects a first reference pulse of the first pulse signature located before the maximum pulse based on a target percentage of a magnitude of the maximum pulse; c) identifies a capture time of the first reference pulse; d) selects a second reference pulse of the second pulse signature which has a peak with a capture time closest to the capture time of the first reference pulse; and e) determines a difference in travel time between the first and second signals based on a difference in capture time between the first and second reference pulses.

8. The biocide generating system of claim 7, wherein the target percentage is in the range of 30-70 percent of the magnitude of the maximum pulse.

9. A biocide-generating system for inhibiting bio-fouling within a water system, the biocide-generating system comprising:
    a housing including a water inlet for receiving water from the water system and a water outlet for outputting water containing biocide to the water system;
    an electrode arrangement including first and second electrodes positioned in the housing for generating biocide in the water within the housing; and
    an electrical power circuit for establishing a flow of electrical current between first and second electrodes of the electrode arrangement for generating the biocide in the water within the housing;
    a flow sensor for sensing water flow through the system, wherein the flow sensor is an ultrasonic flow meter; and
    a system controller that controls the electrical power circuit and interfaces with the flow sensor, wherein a processing device of the system controller and/or of a sensor controller and/or another controller of the system uses data from the ultrasonic flow meter to determine a rate of water flow through the housing, wherein the processing device captures first and second ultrasonic signals of the ultrasonic flow meter which travel through the water in first and second opposite directions, wherein one of the first and second directions is an upstream direction and the other of the first and second directions is a downstream direction, wherein the processing device captures a first pulse signature for the first ultrasonic signal and a second pulse signature for the second ultrasonic signal, wherein the processing device determines the rate of water flow based on a difference in travel time between the first and second signals, wherein to determine the difference in travel time capture times of the first and second ultrasonic signals are compared, wherein to compare the capture times of the first and second ultrasonic signals the processing device: a) selects a first reference pulse of the first pulse signature; b) identifies a capture time of the first reference pulse; c) selects a second reference pulse of the second pulse signature which has a peak with a capture time closest to the capture time of the first reference pulse; and d) determines a difference in travel time between the first and second signals based on a difference in capture time between the first and second reference pulses.

10. A biocide-generating system for inhibiting bio-fouling within a water system, the biocide-generating system comprising:
    a housing including a water inlet for receiving water from the water system and a water outlet for outputting water containing biocide to the water system;
    an electrode arrangement including first and second electrodes positioned in the housing for generating biocide in the water within the housing; and
    an electrical power circuit for establishing a flow of electrical current between first and second electrodes of the electrode arrangement for generating the biocide in the water within the housing;
    a flow sensor for sensing water flow through the system, wherein the flow sensor is an ultrasonic flow meter; and
    a system controller that controls the electrical power circuit and interfaces with the flow sensor, wherein a processing device of the system controller and/or of a sensor controller and/or another controller of the system uses data from the ultrasonic flow meter to determine a rate of water flow through the housing, wherein the processing device captures first and second ultrasonic signals of the ultrasonic flow meter which travel through the water in first and second opposite directions, wherein one of the first and second directions is an upstream direction and the other of the first and second directions is a downstream direction, wherein the processing device determines the rate of water flow based on a difference in travel time between the first and second signals, wherein the rate of water flow is calculated as a flow moving average based on flow rates determined over time from the captured ultrasonic signals, wherein the processing device also determines a signal strength moving average over time from the captured ultrasonic signals, and wherein the processing device uses the signal strength moving average as a basis for establishing a weighting for flow rates added into the flow rate moving average over time.

11. The biocide-generating system of claim 10, wherein a magnitude of the signal strength moving average is used for establishing a weighting for flow rates added into the flow rate moving average over time.

12. The biocide-generating system of claim 10, wherein a rate of change of the signal strength moving average is used for establishing a weighting for flow rates added into the flow rate moving average over time.

13. The biocide-generating system of claim 10, wherein a rate of change and a magnitude of the signal strength moving average are used for establishing a weighting for flow rates added into the flow rate moving average over time.

14. The biocide-generating system of claim 10, wherein the processing device detects an error if a signal capture cannot be processed, and wherein the processing device varies processing protocol for errors based on the signal strength moving average.

15. The biocide-generating system of claim 10, wherein the processing device includes an error management protocol that is more sensitive to errors when the signal strength moving average indicates a good signal strength as compared to when the signal strength moving average indicates a poor signal strength.

* * * * *